(12) United States Patent
Wilson et al.

(10) Patent No.: US 8,444,900 B2
(45) Date of Patent: May 21, 2013

(54) METHOD AND SYSTEM FOR FORMING COMPOSITE GEOMETRIC SUPPORT STRUCTURES

(75) Inventors: Erich A. Wilson, Provo, UT (US); Michael D. Kipp, Highland, UT (US); Michael D. Ridges, American Fork, UT (US)

(73) Assignee: Sigma-Tek, LLC, Lindon, UT (US)

( * ) Notice: Subject to any disclaimer, the term of this patent is extended or adjusted under 35 U.S.C. 154(b) by 603 days.

(21) Appl. No.: 12/542,555

(22) Filed: Aug. 17, 2009

(65) Prior Publication Data

US 2010/0065717 A1     Mar. 18, 2010

Related U.S. Application Data

(60) Provisional application No. 61/089,124, filed on Aug. 15, 2008.

(51) Int. Cl.
*B29C 70/44*   (2006.01)

(52) U.S. Cl.
USPC .......................... 264/258; 156/173; 264/319

(58) Field of Classification Search
USPC .................. 264/357, 258, 319, 101; 156/173
See application file for complete search history.

(56) References Cited

U.S. PATENT DOCUMENTS

| | | | |
|---|---|---|---|
| 31,777 A | 3/1861 | Boynton | |
| 1,766,961 A | 6/1930 | Steuart | |
| 1,818,423 A | 8/1931 | Mummert | |
| 1,975,726 A | 10/1934 | Martinage | |
| 2,060,387 A | 11/1936 | Meek | |
| 2,114,274 A | 4/1938 | Huppert | |
| 2,157,042 A | 5/1939 | Wallis | |
| 2,456,513 A | 12/1948 | Johnson | |
| 2,639,876 A | 5/1953 | Misfeldt | |
| 2,928,360 A | 3/1960 | Heine, Jr. | |
| 3,007,497 A | 11/1961 | Shobert | |

(Continued)

FOREIGN PATENT DOCUMENTS

| | | |
|---|---|---|
| GB | 1174920 | 12/1969 |
| GB | 2004835 | 4/1979 |
| GB | 2049613 | 12/1980 |

OTHER PUBLICATIONS

Composite Tower Solutions, 2 pages.

(Continued)

*Primary Examiner* — Galen Hauth
(74) *Attorney, Agent, or Firm* — Thorpe North & Western LLP

(57) ABSTRACT

A method and system for fabricating a geometrically versatile composite lattice support structure having a seamless three-dimensional configuration. The lattice support structure is created by forming two or more cross supports, such as helical, longitudinal, circumferential and/or lateral cross supports, which intersect to form a plurality of multi-layered nodes. The lattice support structure may be designed without any protrusions extending outward from the overall geometry, thus enabling efficient tooling, and thus enabling ease of mass production. The lattice support structure may comprise a completely circumferentially closed geometry, such as a cylinder, ellipse, airfoil, etc. The method for fabricating the lattice support structure comprises laying up a fiber material, in the presence of resin, within rigid channels of a rigid mold, thus creating a green, uncured three-dimensional geometry of unconsolidated cross supports and multi-layered nodes where these intersect. Subjecting these to a curing system functions to consolidate the cross supports and multi-layered nodes to produce the composite lattice support structure.

66 Claims, 13 Drawing Sheets

U.S. PATENT DOCUMENTS

| | | | |
|---|---|---|---|
| 3,300,354 | A | 1/1967 | Duft |
| 3,644,866 | A | 2/1972 | Deardurff |
| 3,645,833 | A | 2/1972 | Figge |
| 3,857,415 | A | 12/1974 | Morin et al. |
| 3,887,739 | A | 6/1975 | Kromrey |
| 3,940,891 | A | 3/1976 | Slysh |
| 3,962,393 | A | 6/1976 | Blad |
| 4,025,675 | A | 5/1977 | Jonda |
| 4,086,378 | A | 4/1978 | Kam et al. |
| 4,118,262 | A | 10/1978 | Abbott |
| 4,137,354 | A | 1/1979 | Mayes, Jr. et al. |
| 4,254,599 | A | 3/1981 | Maistre |
| 4,260,143 | A | 4/1981 | Kliger |
| 4,278,485 | A | 7/1981 | Hamm et al. |
| 4,278,490 | A | 7/1981 | Pistole et al. |
| 4,284,679 | A * | 8/1981 | Blad et al. ............... 428/218 |
| 4,321,854 | A | 3/1982 | Foole et al. |
| 4,347,287 | A | 8/1982 | Lewis et al. |
| 4,366,658 | A | 1/1983 | Maistre |
| 4,381,820 | A | 5/1983 | Wagner |
| 4,473,217 | A | 9/1984 | Hashimoto |
| 4,475,323 | A | 10/1984 | Schwartzberg et al. |
| 4,695,342 | A | 9/1987 | Belleau et al. |
| 4,706,430 | A | 11/1987 | Sugita et al. |
| 4,786,341 | A | 11/1988 | Kobatake et al. |
| 4,819,395 | A | 4/1989 | Sugita et al. |
| 4,940,617 | A | 7/1990 | Baurmeister |
| 5,048,441 | A | 9/1991 | Quigley |
| 5,051,226 | A | 9/1991 | Brustad et al. |
| 5,200,251 | A | 4/1993 | Brand |
| 5,266,137 | A * | 11/1993 | Hollingsworth ............... 156/156 |
| 5,463,970 | A | 11/1995 | Hartlmeier et al. |
| 5,505,035 | A | 4/1996 | Lalvani |
| 5,556,677 | A * | 9/1996 | Quigley et al. ............... 428/36.2 |
| 5,814,386 | A | 9/1998 | Vasiliev et al. |
| 5,871,117 | A * | 2/1999 | Protasov et al. ............... 220/592 |
| 5,921,048 | A | 7/1999 | Francom et al. |
| 5,962,150 | A | 10/1999 | Priluck |
| 6,013,341 | A * | 1/2000 | Medvedev et al. ............ 428/36.3 |
| 6,050,315 | A | 4/2000 | Deckers et al. |
| 6,053,696 | A | 4/2000 | Roberts |
| 6,076,324 | A | 6/2000 | Daily et al. |
| 6,264,684 | B1 | 7/2001 | Banas et al. |
| 6,290,799 | B1 * | 9/2001 | Deckers et al. ............... 156/264 |
| 7,132,027 | B2 | 11/2006 | Jensen |
| 7,976,925 | B2 | 7/2011 | Rasmussen |
| 2007/0175031 | A1 | 8/2007 | Pham et al. |

OTHER PUBLICATIONS

Fiber Innovations: Resin Transfer Modling (RTM), VaRTM, Composite Structures, 1 page.
Carbon C-Thru Road Frame, Jan. 2008, pp. 2-10, www.bmeres.com/c-thruframe.htm.
Scientific and Technical Information, Open-Lattice Composite Design Strengthens Structures, Spinoff 2007, 3 pages.
Titus Cycles—IsoGrid Technology, 1 page.
Wellington Bomber, The Vickers Armstron Wellington, The Mighty Wimpy, 2 pages.
3TEX, Inc. 2007, Research to Reliability to Realtiy, 3-Dimension Reinforcement.
Vasiliev et al., "Anisogrid composite lattice structures for spacecraft and aircraft applications" Composite structures, ISSN 0263-8223, International Conference on COmposite Materials N 15 Durban, Jun. 27, 2005.
An Hou, Buckling Strength of Composite Lattice Structures, 1997, 3 pages.
Carbon Fiber Machining—manual and computer controlled production—PCT Power & Composite Technologies Inc., 1 page.
Millenium Tower, Toyko—SkyscraperPage.com, 2008, 2 pages.
Greenside Place Link Bridge, Edinburgh. Case Study. htt://www.lusas.conn/case/bridge/greenside.html. As accessed on Apr. 27, 2010. pp. 1-3.
Steven M. Hansen. "Influence of Consolidation and Interweaving on Compression Behavior of Isotruss". Thesis submitted to faculty at BYU. Apr. 2004.
Sarita Lee Kesler. "Consolidation and Interweaving of Composite Members by a Continuous Manufacturing". Thesis submitted to the faculty at BYU. Dec. 2006.
PCT Application PCT/US2011/036694; filed May 16, 2011; Erich Wilson; International Search Report mailed Feb. 17, 2012.
U.S. Appl. No. 12/542,607, filed Aug. 17, 2009; Erich A. Wilson; office action issued Dec. 23, 2011.
U.S. Appl. No. 12/542,613, filed Aug. 17, 2009; Erich A. Wilson; office action issued Dec. 9, 2011.
U.S. Appl. No. 13/108,873, filed May 16, 2011; Erich A. Wilson.
U.S. Appl. No. 12/542,442, filed Aug. 17, 2009; Erich A. Wilson; office action issued Jun. 1, 2012.
U.S. Appl. No. 12/542,607, filed Aug. 17, 2009; Erich A. Wilson; Notice of allowance issued Jul. 5, 2012.
U.S. Appl. No. 12/542,613, filed Aug. 17, 2009; Erich A. Wilson; office action issued Apr. 20, 2012.

* cited by examiner

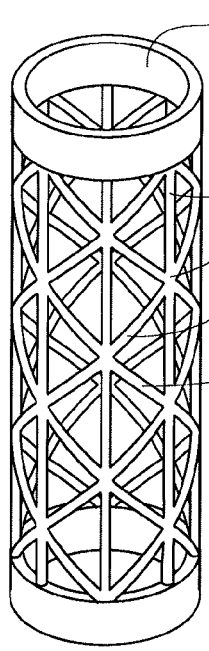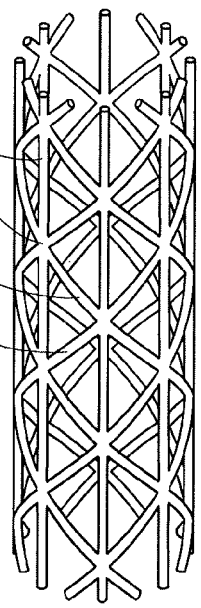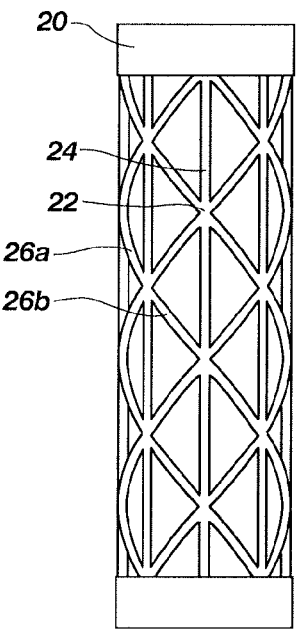
*FIG. 1A*  *FIG. 1B*  *FIG. 1C*
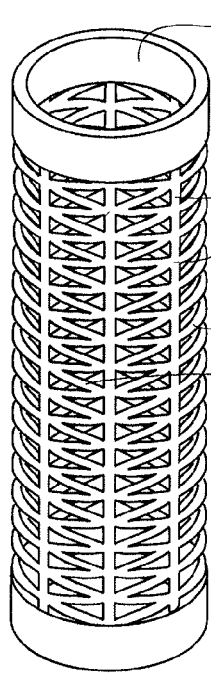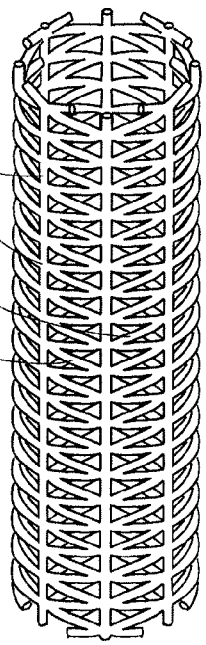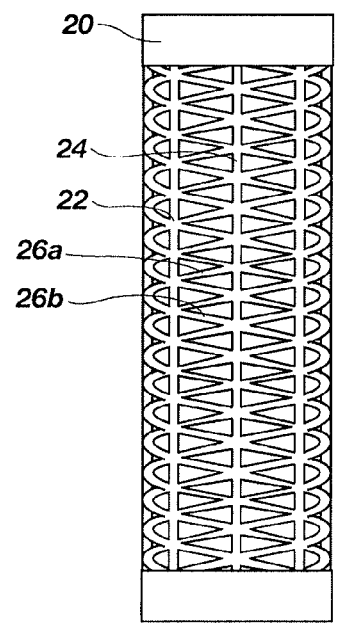
*FIG. 2A*  *FIG. 2B*  *FIG. 2C*

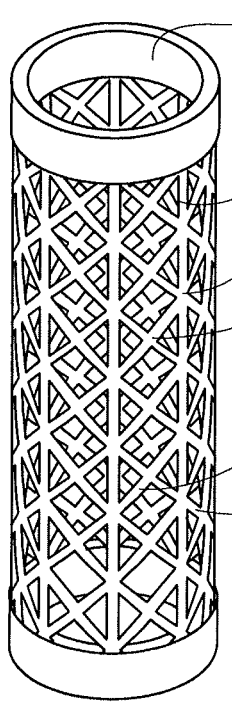 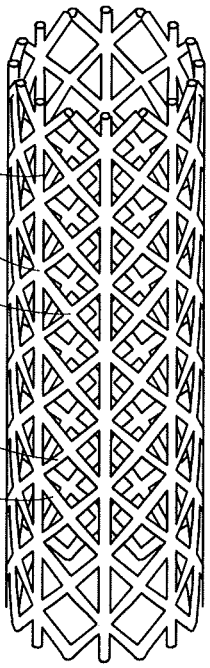 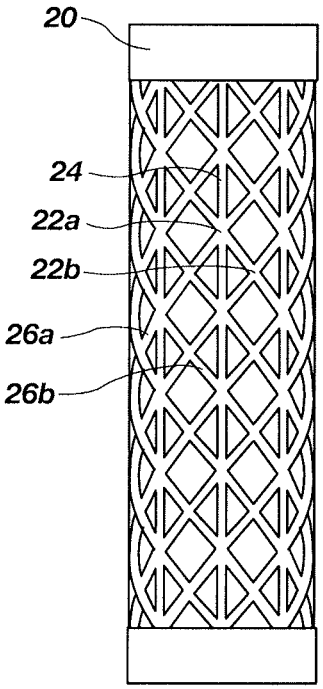
FIG. 3A                FIG. 3B                FIG. 3C
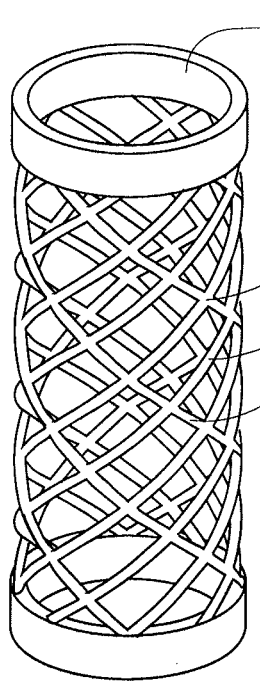 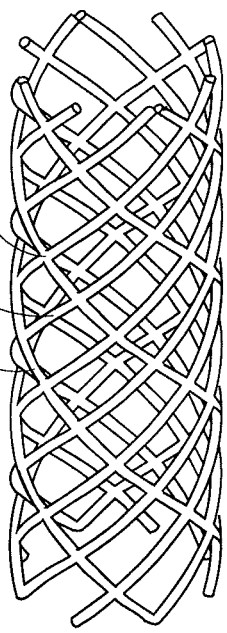 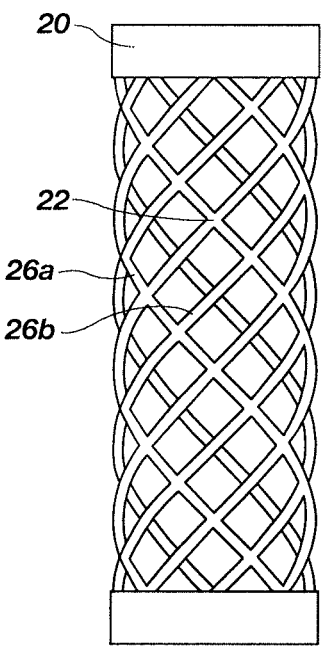
FIG. 4A                FIG. 4B                FIG. 4C

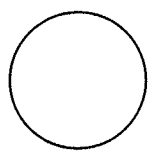  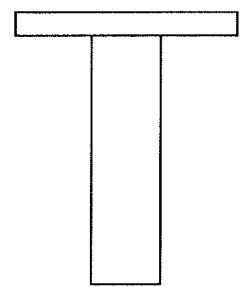 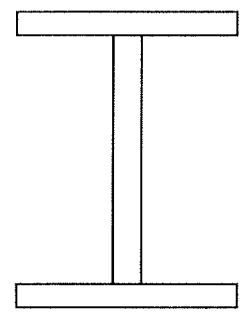
*FIG. 12A*  *FIG. 12B*  *FIG. 12C*  *FIG. 12D*
  
*FIG. 13A*  *FIG. 13B*  *FIG. 13C*
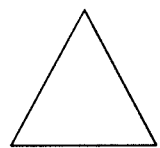 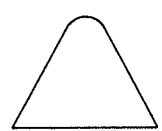 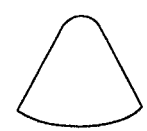
*FIG. 13D*  *FIG. 13E*  *FIG. 13F*

METHOD AND SYSTEM FOR FORMING COMPOSITE GEOMETRIC SUPPORT STRUCTURES

RELATED APPLICATIONS

This application claims the benefit of U.S. Provisional Application No. 61/089,124, filed Aug. 15, 2008, and entitled, "Three-Dimensional Geo-Strut Structure and Method of Manufacture," which is incorporated by reference in its entirety herein.

FIELD OF THE INVENTION

The present invention relates generally to complex three-dimensional geometric lattice support structures that have enhanced load bearing capacity per unit weight, and that are formed from composite materials (e.g., lattice structures formed from carbon or other fiber reinforcements and resin (e.g., polymer matrix) constituents). More particularly, the present invention relates to the methods and systems used in the formation of such structures.

BACKGROUND OF THE INVENTION AND RELATED ART

Development of improved support structures in the fields of civil, mechanical and aerospace design is a constant and ongoing effort. One primary focus of these efforts is in producing efficient support structures that exhibit high strength properties while being low in weight. In other words, a beneficially efficient support structure will comprise a relatively high force to weight ratio.

In the field of composite lattice support structures, a primary issue concerning such structures relates to the difficulty in the manufacturing methods used to form the individual support members making up the lattice structure.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIGS. 1A-1C depict exemplary embodiments of lattice support structures in accordance with embodiments of the present disclosure;

FIGS. 2A-2C depict alternative exemplary embodiments of lattice support structures in accordance with embodiments of the present disclosure;

FIGS. 3A-3C depict alternative exemplary embodiments of lattice support structures in accordance with embodiments of the present disclosure;

FIGS. 4A-4C depict alternative exemplary embodiments of lattice support structures in accordance with embodiments of the present disclosure;

FIGS. 12A-12D depict alternative exemplary embodiments of cross-sectional geometries of individual cross supports;

FIGS. 13A-13F depict still further alternative exemplary embodiments of cross-sectional geometries of individual cross supports;

DETAILED DESCRIPTION OF EXEMPLARY EMBODIMENTS

Figure 5:
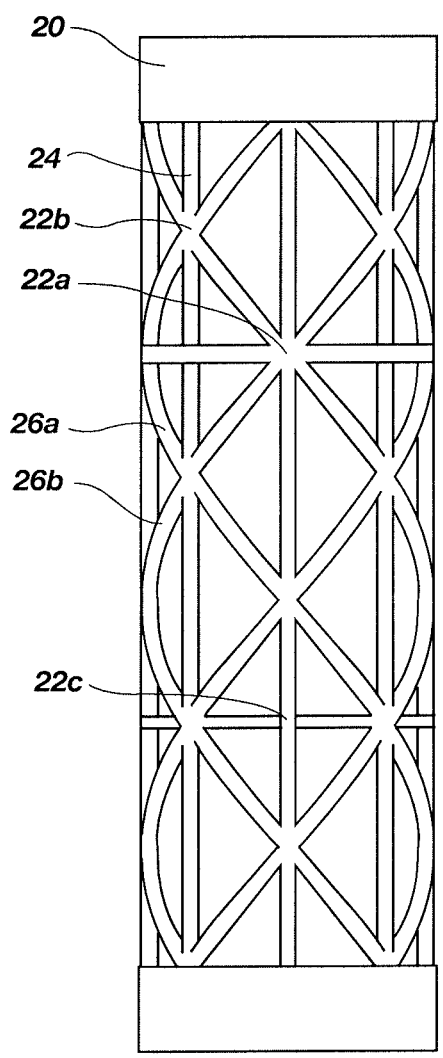
FIG. 5 depicts an alternative exemplary embodiment of another lattice support structure in accordance with embodiments of the present disclosure.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only to describe the features and characteristics of the present invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

At the outset, the term "fiber-based composite material" shall be understood to mean a material comprised of carbon or other fiber (e.g., a carbon or glass fiber filament) and resin (e.g., polymer matrix) constituents.

When referring to a "multi-layered" node, what is meant is that the cross supports are not merely stacked on top of one another, but rather, a first individual cross support has multiple layers with one or more layer(s) of material from other cross supports therebetween. Thus, in order to be "multi-layered, there must be at least one cross support or layer of at least one cross support that is between at least two layers of another cross support. Typically, however, each cross support of the node is layered with other cross support layers therebetween (as shown hereinafter in FIG. 7). The term "multi-layered" node may also be described as one or more selective individual fiber filaments of one cross support intersecting and being layered with one or more individual selective fiber filaments of at least one other cross support.

The term "preform" shall be understood to mean the green, uncured composite lay-up comprising the fiber material and resin composite as situated about the rigid mold, and that has undergone preliminary shaping but is not yet in its final consolidated or cured form.

The present invention provides methods and systems for forming composite lattice support structures. Examples of other composite articles and methods for the fabrication thereof can be found in Applicants' copending U.S. patent applications filed Aug. 17, 2009 under Ser. Nos. 12/542,442 and 12/342,607, each of which is incorporated herein by reference. Examples of rigid molds, such as rigid mandrels, for use in the fabrication of fiber-based composite articles can be found in Applicants' copending U.S. patent application filed Aug. 17, 2009 under Ser. No. 12/342,613, which is incorporated herein by reference. Examples of curing systems for use in forming fiber-based composite articles can be found in Applicant's copending U.S. patent application filed Aug. 17, 2009 under Ser. No. 61/234,553, which is incorporated herein by reference.

The present invention describes a method for forming a composite lattice support structure. The method can comprise forming first and second cross supports where the first and second cross supports intersect at one or more locations, each being formed from having a fiber-based composite material. The method can also comprise forming one or more multi-layered nodes where the first and second cross supports intersect, with one or more selective individual fiber filaments of the first cross support intersecting and being layered with one or more individual selective fiber filaments of the second cross support to define the multi-layered nodes. The first and second cross supports, with the multi-layered nodes, define a lattice support structure having a seamless three-dimensional geometry about a centerline. The method can also include forming multiple additional cross supports, or a plurality of cross supports, these intersecting with one another to define or form a plurality of primary and/or secondary multi-layered nodes.

The present invention also describes a method for forming a composite lattice support structure having a plurality of cross supports intersecting one another to form a plurality of multi-layered nodes. The method can comprise obtaining a rigid mold having a plurality of rigid channels, at least some of the plurality of rigid channels intersecting at strategic locations. The method can also comprise laying up a fiber material, in the presence of a resin, within the channels, and then consolidating the lay-up in the presence of heat and pressure to form a plurality of composite cross supports having a pre-determined lateral cross-sectional area controlled by a cross-sectional area of the channels, and that intersect to form a plurality of nodes. The channels are intended to contain the consolidated lay-up and facilitate the formation of the cross supports. Additionally, at least some of the cross supports can be curved from node to node to provide non-linear path loading along the cross supports.

The present invention further describes a method for preparing a green (or uncured) composite three-dimensional lattice lay up for use in forming a seamless three-dimensional geometric support structure. The method can comprise obtaining a rigid mold having one or more channels associated therewith, obtaining a fiber material, depositing the fiber material, in the presence of a resin, onto the rigid mold within the channels, causing at least some of the fiber materials to extend in a three-dimensional orientation about a centerline, and then causing one or more of the fiber materials to intersect to and to layer to form a lattice structure, and a plurality of multi-layered nodes. This method may also include causing additional fiber materials to extend laterally, circumferentially or axially with respect to the centerline, which additional fiber materials may be caused to intersect and be layered with any other present fiber materials.

The present invention further describes a system for forming complex three-dimensional composite lattice support structures, the system comprising a rigid mold having a plurality of rigid channels, at least some of the plurality of rigid channels intersecting at strategic locations; a lay-up of fiber material, in the presence of a resin, within the channels, the fiber material comprising fiber filaments that are layered with one another and that intersect at the strategic locations; and a curing system for consolidating the lay-up to form a plurality of cross supports and multi-layered nodes.

The present invention complex composite lattice support structure provides several significant advantages over prior related lattice support structures, depending upon its configuration and makeup, some of which are recited here and throughout the following more detailed description. For instance, the lattice support structure of the present invention provides a three-dimensional structure with enhanced load bearing capacity per unit mass. It provides a structural unit whose members do not geometrically protrude from the general body of the unit. It provides a structural unit for which the production tooling and methods of fabricating are efficient and relatively inexpensive, thus lending the support structure to mass production. It provides a structural unit that is geometrically flexible to conform to designs such as cylinders, ellipses, airfoils, and other circumferentially closed geometries. It provides a structural member capable of withstanding torsional loading where the unit can be specifically designed for torsional loads through the number and density of cross supports. It provides a structural member capable of withstanding cyclical loading. Among other applications, It provides a structural member suitable for mechanical and aerospace applications, such as structural aircraft components or drive shafts where high strength and low weight are needed.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention. In addition, some or all of these advantages, as well as others not recited, may be applicable or not depending upon the particular lattice support structure and intended application.

With specific reference to FIGS. 1A, 1B, and 1C, one embodiment of a lattice support structure is shown. FIG. 1A and FIG. 1C are identical, showing different views of the same structure. FIG. 1B is identical to FIG. 1A, except that it does not include optional support collars 20 on each end of the lattice support structure. These lattice support structures each comprise a plurality of fiber-based cross supports intersecting one another to form several multi-layered nodes 22. It is noted that there are eight longitudinal cross supports 24 and eight helical cross supports 26a, 26b (four twisting clockwise 26a from top to bottom and four twisting counterclockwise 26b from top to bottom). Nodes are formed in this embodiment where three cross supports (one longitudinal cross support, one clockwise helical cross support, and one counterclockwise helical cross support) intersect. The helical cross supports form curved node-to-node cross support segments. This structure also demonstrates 4 helical cross supports taken at a given pitch, 1 turn per 7 inches, with 4 counter wrapped helical cross supports of equal pitch combined with longitudinal cross supports, coupled at a plurality of multi-layered nodes where the ends have been consolidated by a collar. It is noted that this structure profile, including number and direction of turns, number and position of various cross supports, etc., is merely exemplary, and can be modified slightly or significantly in accordance with embodiments of the present disclosure.

With specific reference to FIGS. 2A, 2B, and 2C, another embodiment of a lattice support structure is shown. FIG. 2A and FIG. 2C are identical, showing different views of the same structure. FIG. 2B is identical to FIG. 2A, except that it does not include optional support collars 20 on each end of the lattice support structure. These lattice support structures each comprise a plurality of fiber-based cross supports intersecting one another to form several multi-layered nodes 22. It is noted that there are eight longitudinal cross supports 24 and eight helical cross supports 26a, 26b (four twisting clockwise 26a from top to bottom and four twisting counterclockwise 26b from top to bottom). Nodes are formed in this embodiment where three cross supports (one longitudinal cross support, one clockwise helical cross support, and one counterclockwise helical cross support) intersect. The helical cross supports form curved node-to-node cross support segments. It is noted that the primary difference between the structures shown in FIGS. 1A-1C and the structures shown in FIGS. 2A-2C is the increased frequency of twists for the helical lattice support structures in FIGS. 2A-2C. This structure also demonstrates 4 helical cross supports taken at a given pitch, 5 turns per 7 inches, with 4 counter wrapped helical cross supports of equal pitch combined with longitudinal cross supports, coupled at a plurality of multi-layered nodes where the ends have been consolidated by a collar.

With specific reference to FIGS. 3A, 3B, and 3C, another embodiment of a lattice support structure is shown. FIG. 3A and FIG. 3C are identical, showing different views of the same structure. FIG. 3B is identical to FIG. 3A, except that it does not include optional support collars 20 on each end of the lattice support structure. These lattice support structures each comprise a plurality of fiber-based cross supports intersecting one another to form several multi-layered nodes 22a, 22b. Again, it is noted that there are eight longitudinal cross supports 24. However, in this embodiment, there are sixteen (16) helical cross supports 26a, 26b (eight twisting clockwise 26a from top to bottom and eight twisting counterclockwise 26b from top to bottom). This embodiment demonstrates that the density of cross supports (in this case helical cross supports) may be selectively varied between different support structures, depending upon the loading or other performance requirements the lattice support structure is intended to provide. For instance, when compared with the support structure embodiment of FIGS. 1A, 1B and 1C, having a total of eight cross supports, the support structure of this embodiment illustrates a greater number of helical cross supports.

Also, in this embodiment, two different types of multi-layered nodes are formed. First, multi-layered nodes 22a are formed where three cross supports (one longitudinal cross support, one clockwise helical cross support, and one counterclockwise helical cross support) intersect. Multi-layered nodes 22b are also formed where two helical cross supports (one clockwise helical and one counterclockwise helical) intersect without a longitudinal cross support. This structure also demonstrates 8 helical cross supports taken at a given pitch, 1 turn per 7 inches, with 8 counter wrapped helical cross supports of equal pitch combined with longitudinal cross supports, coupled at a plurality of multi-layered nodes where the ends have been consolidated by a collar. It is also noted that additional multi-layered nodes are present that do not include longitudinal cross supports.

With specific reference to FIGS. 4A, 4B, and 4C, another embodiment of a lattice support structure is shown. FIG. 4A and FIG. 4C are identical, showing different views of the same structure. FIG. 4B is identical to FIG. 4A, except that it does not include optional support collars 20 on each end of the lattice support structure. These lattice support structures each comprise a plurality of fiber-based cross supports intersecting one another to form several multi-layered nodes 22. In this embodiment, there are no longitudinal cross supports. Also in this embodiment, there are twelve (12) helical cross supports 26a, 26b (four twisting clockwise 26a from top to bottom and eight twisting counterclockwise 26b from top to bottom). This embodiment thus also demonstrates the ability to design for unidirectional torsion and other loads through varying the number of members in the clockwise direction from those in the counterclockwise direction, or vice versa. This embodiment also demonstrates the ability to space cross supports as needed, and that not all cross supports have to be spaced an equidistance from one another. Nodes 22 are formed where two helical cross supports (one clockwise helical cross support and one counterclockwise helical cross support) intersect without a longitudinal cross support.

With specific reference to FIG. 5, another embodiment of a lattice support structure is shown. In this embodiment, not only are longitudinal cross supports 24 and helical cross supports 26 provided, but circumferential or lateral cross supports 28 are also provided. Again, these lattice support structures each comprise a plurality of fiber-based cross supports intersecting one another to form several multi-layered nodes 22a, 22b, 22c. In this embodiment, there are eight helical cross supports and eight longitudinal cross supports, as described previously in FIGS. 1A-1C. However, there are also two additional circumferential cross supports. Thus, in this embodiment, there are three different multi-layered node configurations. First, multi-layered nodes 22a are formed where four cross supports (one longitudinal cross support, one circumferential cross support, one clockwise helical cross support from top to bottom, and one counterclockwise helical cross support from top to bottom) intersect. Multi-layered nodes 22b are also formed where three cross supports (one longitudinal cross support, one clockwise helical cross support from top to bottom, and one counterclockwise helical cross support from top to bottom) intersect. Next, multi-layered nodes 22c are formed where two cross supports (one longitudinal cross support and one circumferential cross support) intersect.

It is noted that FIG. 1A to FIG. 5 are provided for exemplary purposes only, as many other structures can also be formed in accordance with embodiments of the present disclosure. For example, from structure to structure, twist pitch can be modified for helical cross supports, longitudinal cross supports added symmetrically or asymmetrically, circumferential cross supports can be added uniformly or asymmetrically, node locations and/or number of cross supports can be varied, as can the overall geometry of the resulting part including diameter, length and the body-axis path to include constant, linear and non-linear resulting shapes as well as the radial path to create circular, triangular, square and other polyhedral cross-sectional shapes with or without standard rounding and filleting of the corners, etc. In other words, the present invention lattice supports structures are highly customizable, and may be constructed or formed in accordance with a number of design parameters or variables. They can be tailored to a specific need. For example, if the weight of a lattice support structure needs to be kept to a minimum, then the lattice support structure may be designed and formed accordingly to provide only those cross supports that are needed, with these being oriented, spaced and configured as optimally as possible. Obviously, the converse is true with support structures capable of being designed accordingly, such as where weight requirements are secondary to any load bearing requirements. In essence, several design variables exist that include, but are not limited to pitch angle, number of helical cross supports, number of longitudinal and lateral cross supports, multiple pitch angles, spacing of cross supports, partial length cross supports, selective cross support cross-sectional areas, amount of tow wrap, type of tow, etc.

Figure 6A:
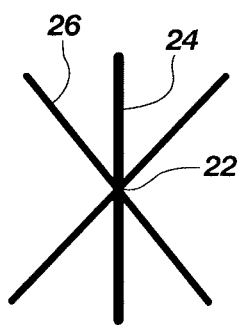
FIGS. 6A-6F depict various arrangements of cross supports and various node configurations in accordance with embodiments of the present disclosure.
Figure 6B:
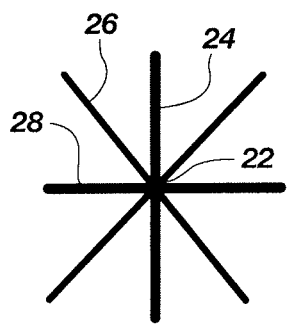
Figure 6C:
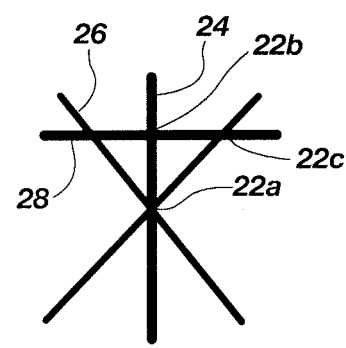
Figure 6D:
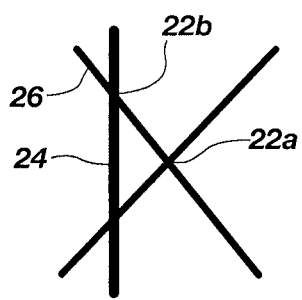
Figure 6E:
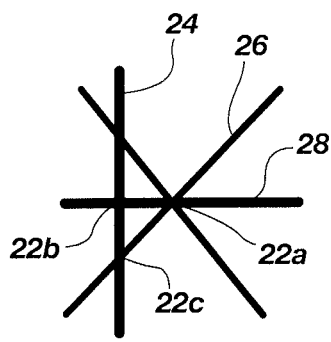
Figure 6F:
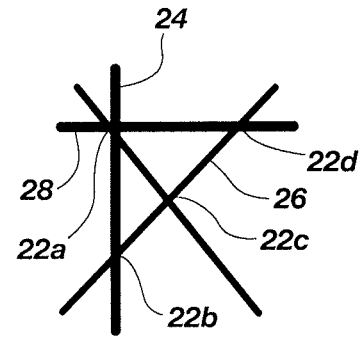

In accordance with this, FIGS. 6A-6F provide exemplary relative arrangements for helical, longitudinal, and circumferential cross supports that can be used in forming lattice support structures. Various node placements are also shown in these FIGS. FIG. 6A depicts a longitudinal cross support 24 and helical cross supports 26, forming a multi-layered node 22 at the intersection of all three cross supports. This is similar to that shown in FIGS. 1A-3C and 5. FIG. 6B depicts a longitudinal cross support 24, helical cross supports 26, and a circumferential cross support 28 forming a multi-layered node 22 at the intersection of all four cross supports. FIG. 6C depicts a longitudinal cross support 24, helical cross supports 26, and a circumferential cross support 28 forming three different types of multi-layered nodes 22a, 22b, 22c. FIG. 6D depicts a longitudinal cross support 24 and helical cross supports 26 forming two different types of multi-layered nodes 22a, 22b. FIG. 6E depicts a longitudinal cross support 24, helical cross supports 26, and a circumferential cross support 28 forming three different types of multi-layered nodes 22a, 22b, 22c. It is noted that this arrangement provides two multi-layered nodes that are similar to FIG. 6C (22a, 22b) and one that is different (22c). Specifically, multi-layered node 22c in FIG. 6C comprises a circumferential cross support and a helical cross support, whereas multi-layered node 22c in FIG. 6E comprises a longitudinal cross support and a helical cross support, thus illustrating the flexibility of design of the lattice support structures of the present disclosure. FIG. 6F depicts a longitudinal cross support 24, helical cross supports 26, and a circumferential cross support 28 forming four different types of multi-layered nodes 22a, 22b, 22c, 22d.

Figure 7:
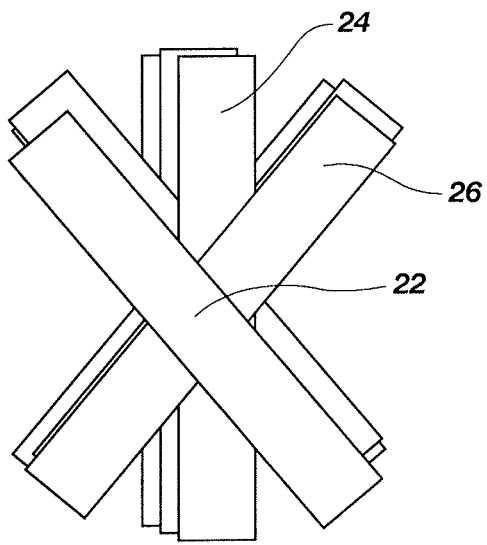
FIG. 7 depicts a multi-layered node configuration prior to fusion and/or consolidation in accordance with embodiments of the present disclosure, where each cross support includes multiple layers and the layers are stacked with other cross support material from different cross supports therebetween.

Turning to FIG. 7, more detail is provided with respect to forming multi-layered nodes in accordance with embodiments of the present disclosure. Specifically, for illustrative purposes only, the multi-layered node 22 shown in FIG. 6A is shown in more detail prior to heat and pressure fusion or consolidation. As can be seen in this embodiment, a longitudinal cross support 24 and two helical cross supports 26 are shown. Specifically, each cross support comprises multiple layers, and at the multi-layered node, each layer is separated from a previously applied layer by at least one other cross support layer. In this manner, a multi-layered node is formed that can be cured in accordance with embodiment of the present disclosure. Each layer of each cross support comprises a plurality of fiber filaments.

Generally speaking, in one embodiment, the curing process comprises applying 90-150 psi nitrogen gas at 250-350° F. for a soak period of about 10 to 240 minutes depending on the size of the part and its coinciding tooling. In this embodiment, the cross supports with layered and interleaved nodes can be applied to a solid mandrel and wrapped with a membrane or bag. Once in place, the pressure from the ambient curing gas provides an even press through the bag on the entire part, thus curing and consolidating the multi-layered nodes. The method for forming the lattice support structures, including the curing or consolidation steps, is described in greater detail below.

Figure 8:
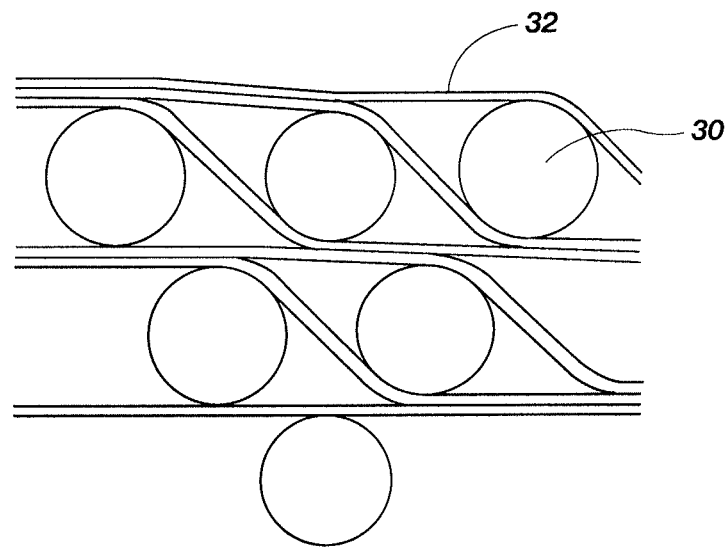
FIG. 8 depicts node layering in cross section in accordance with one embodiment of the present disclosure.
Figure 9:
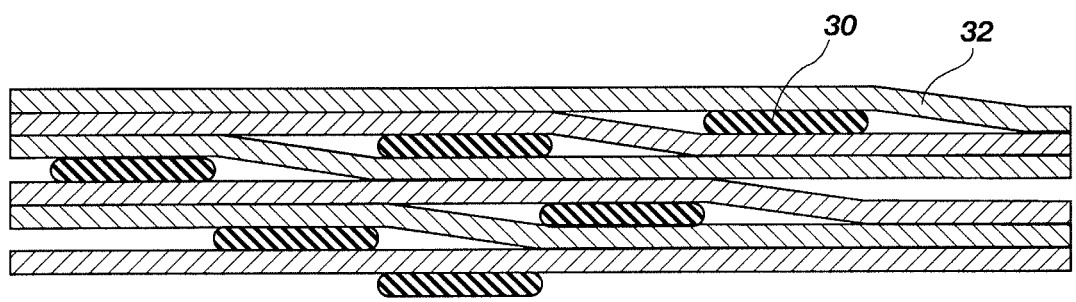
FIG. 9 depicts node layering in cross section in accordance with another embodiment of the present disclosure.

FIGS. 8 and 9 depict schematic representations of possible multi-layered node structures. Specifically, FIG. 8 depicts layering using tow material of low fiber count and what a nodal cross-section might appear to be like before consolidation; and FIG. 9 depicts what the layering would appear like after consolidation. It is noted that the fiber of high fiber-count tow or tape products may appear like FIG. 9 prior to consolidation as well, and after consolidation, the node would appear even more flattened in shape. In these FIGS., it is assumed that six layers of tow or tape are wrapped to demonstrate the leaving of layers in the nodes. In each of these two figures, the cross support fiber material 30 shown on end (along the Z-axis) in cross-section can be assumed to be members which continue into and out of the respective FIG. The cross support fiber material 32 crossing them (along the X- and Y-axis) represent a single cross-support members, and collectively, these cross supports form nodes of the shape similar to 22b, 22c and 22d in FIGS. 6E and 6F. In these illustrations, the helical cross support is approaching from the left side. Were there to be an additional helical member wrapped in the opposite direction, it would look to be the mirror image of the one shown and approach from the right side of the figures.

Figure 10:
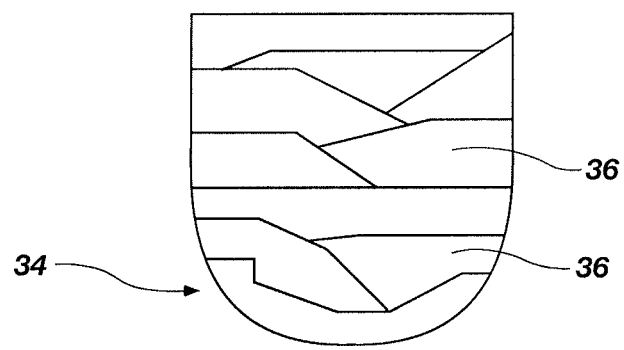
FIG. 10, depicts a cutaway portion of an exemplary consolidated node in accordance with embodiments of the present disclosure.

FIG. 10 sets forth a cutaway cross-section of a multi-layered node after curing and consolidation of the layered material. Note the cross-sectional area of the member is set into a half-pipe geometry 34 (as consolidated and forced into half-pipe shaped grooves formed in a solid mandrel), though other geometries are certainly a design option, depending on the shape of the solid mandrel grooves. This consolidated node structure shows a distinction in structure compared to the prior art junctions where weaving and/or braiding are used. Most notably, a build-up of material in the node resulting from coupling the material from various members in various directions allows for the forming of a consolidated node that is compacted and cured, adding strength to the overall structure. Rather than stacking each layer directly on top of the next, the leaving as in FIGS. 8 and 9 allows for individual wraps 36 of tow or tape to end up side-by-side and stacked as a function of the geometry they are forced into before curing. Likewise, FIG. 11 sets forth an exemplary consolidated node sectioned orthogonally to the longitudinal axis depicting the change in member width approaching the node and massing of layered material near and on the node as just described.

In further detail with respect to the embodiments shown in FIGS. 1-11, the present disclosure relates to helical cross supports wrapped around a centerline where the helical cross supports have curved segments rigidly connected end to end and layered with or without axial, radial, or laterally configured cross supports (e.g., longitudinal and/or circumferential cross supports) which can be straight or curved end to end.

The curves of the helical cross support segments can comply directly with the desired geometric shape of the overall unit. In other words, the lattice support structure comprises no structural segments protruding beyond the outer circumference. In one embodiment, the structure can include at least two helical cross supports. As described above, at least one of the helical cross supports wraps around the centerline in one direction (clockwise from top to bottom, for example) while at least one other wraps around in the opposite direction (counterclockwise from top to bottom, for example). Though a "top to bottom" orientation is described, this is done for convenience only, as these structures may be oriented other than in a vertical configuration (horizontal, angular, etc.). Helical cross supports wrapped in the same direction can have the same angular orientation and pitch, or can have different angular orientations and pitch. Also, the spacing of the multiple helical cross supports may not necessarily be spaced apart at equal distances, though they are often spaced at equal distances. The reverse helical cross supports can be similarly arranged but with an opposing angular direction. These helical cross supports can cross at multi-layered nodes, coupling counter oriented helical cross supports through layering of the filaments. This coupling provides a ready distribution of the load onto the various structural supports. When viewed from the centerline, the curving segments of the components can appear to match the desired geometry of the structural unit with no significant protrusions, i.e. a cylindrical unit appears substantially as a circle from the centerline. In this embodiment, all components can share a common centerline.

Additional structural supports can also be included in the lattice support structure. Components which are straight from junction to junction may be included to intersect multi-layered nodes parallel to the centerline to form unidirectional members (e.g. longitudinal cross supports). Components, which can be curved or straight, can also be added circumferentially to intersect with the multi-layered nodes along the length of the lattice support structure. These circumferential cross supports can be added to increase internal strength of the structure. These additional members may be added to intersect at the multi-layered nodes, but do not necessarily need to intersect the nodes formed by the helical cross supports crossing one another, e.g. they may cross at areas between helical-helical nodes. In other words, the longitudinal cross supports and/or the circumferential cross supports may form common multi-layered nodes with helical-helical formed multi-layered nodes, or can form their own multi-layered nodes between the helical-helical formed multi-layered nodes. In either case, the multi-layered nodes can still be formed using filament layering. The count of helical members compared to other members is flexible in certain embodiment to allow for multi-layered nodes to occur only as lattice support structures intersect in a given location, or to allow for multiple node locations composed of two or more, but not all of the members in the structure. The capability of such a design allows versatility in the number of helical cross supports, the coil density, as well as the number of multi-layered nodes or intersections with axial, radial, or lateral components. As a general principle, the more strength desired for an application, the higher the coil density; whereas, the less strength desired, the fewer coils and wider the wrap length per coil may be present.

Structural supports may be covered with a material to create the appearance of a solid structure, protect the member or its contents, or provide for fluid dynamic properties. The current disclosure is therefore not necessarily a traditional pipe, rope, coil, spring, or solid shaft, neither is it a reinforcement for a skin cover. Even though the structures disclosed herein are relatively lightweight, because of its relative strength to weight ratio, these lattice support structures are strong enough to act as stand-alone structural units. Further, these structures can be built without brackets to join individual lattice support structures.

Figure 11:
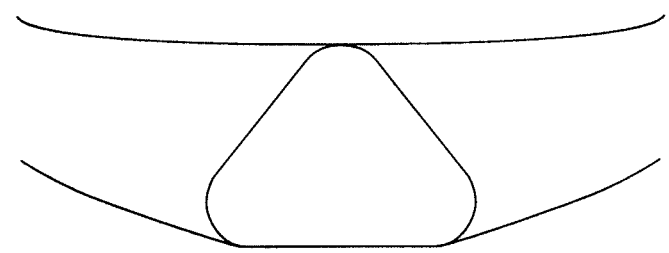
FIG. 11 depicts an exemplary consolidated node sectioned orthogonally to the longitudinal axis depicting the change in member width approaching the node and massing of layered material near and on the node.

In accordance with one embodiment, the present disclosure can provide a lattice structure where individual supports structures are wrapped with uni-directional tow, where each helical cross support, for example, is a continual strand. Further, it is notable that an entire structure can be wrapped with a single strand, though this is not required. Also, the lattice support structures are not weaved or braided, but rather, can be wrapped layer by layer where a leaving structure is created in the nodes. Thus, where the helical cross supports intersect one another and/or one or more longitudinal and/or circumferential cross supports, these intersections create multi-layered nodes of compounded material which couple the members together. In one embodiment, the composite strand does not change major direction at these multi-layered nodes to form any polyhedral shape when viewed from the axial direction. FIG. 11 as a cross section of a longitudinal member depicts the extent of the bending of the helical members intended in this disclosure. This is also evident in FIGS. 1-5 through the creation of cylindrical parts using this technology. Thus, the strand maintains their path in its own axial, circumferential, or helical direction based on the geometry of the part. Once wrapped in this manner, the multi-layered nodes and the entire part can be cured and/or fused as described herein or by other methods, and the multi-layered nodes can be consolidated As discussed in greater detail below, it is also noted that these lattice support structures can be formed using a rigid mandrel, having grooves embedded therein for receiving filament when forming the lattice supports structure. Being produced on a mandrel allows the cross-sectional area of the cross supports making up the structural support unit to be specifically controlled. For example, individual cross supports may comprise a cross-sectional area that is round (see FIG. 12A), rectangular (see FIG. 12B), T-shaped or flanged (see FIG. 12C), I-beam shaped or double flanged (see FIG. 12D), or virtually any other shape or configuration.

FIGS. 13A-13F further illustrate that these cross-sectional shapes or configurations may further comprise rounded corners, as well as linear and/or nonlinear sides, or a combination of such. For instance, FIG. 13A illustrates a cross support having a generally rectangular shape, with a flat inner surface (surface facing toward the centerline of the structural support), rounded upper corners, and a generally convex outer surface (surface facing away from the centerline). FIG. 13B illustrates a cross support having a generally half-circle cross-sectional shape, with an outer surface being generally convex. FIG. 13C illustrates a cross support having a generally triangular cross-sectional shape, with each corner being rounded. FIG. 13D illustrates a cross support having a triangular shape, with no rounded corners. FIG. 13E illustrates a cross support having a generally triangular cross-sectional shape, with an upper rounded corner, and a generally flat outer surface. FIG. 13F illustrates a cross support having a generally triangular cross-sectional shape, with an upper rounded corner, and a generally convex outer surface. The several cross-sectional areas or configurations illustrated in the FIGS and discussed herein are merely exemplary of the several configurations made possible by controlling the tooling used to produce the cross supports. By controlling the tooling, and particularly the channels or grooves of the mandrel, the cross-sectional area of individual cross supports (and multi-layered nodes) can be specifically controlled and optimized for a given design. It is noted also that not all cross supports within a given lattice support structure are required to comprise the same cross-sectional area or configuration. Indeed, a lattice support structure may comprise a plurality of cross supports with different cross-sectional areas.

Figure 14A:
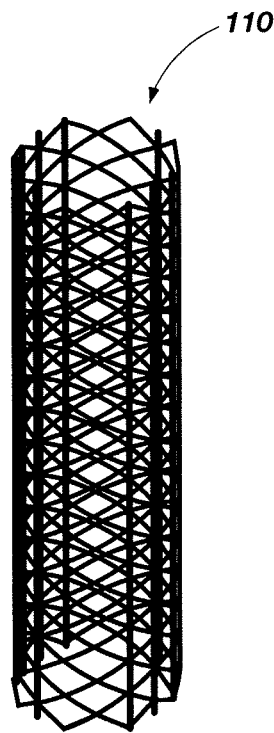
FIGS. 14A-14C depict an exemplary lattice support structure having a plurality of longitudinal and helical cross supports, wherein the longitudinally oriented cross supports comprise a t-shaped cross-sectional geometry.
Figure 14B:
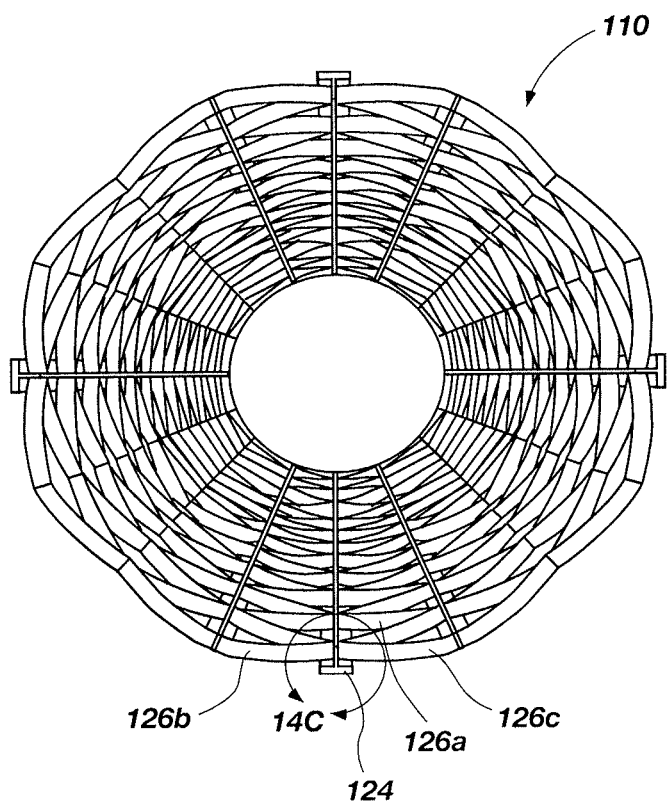
Figure 14C:
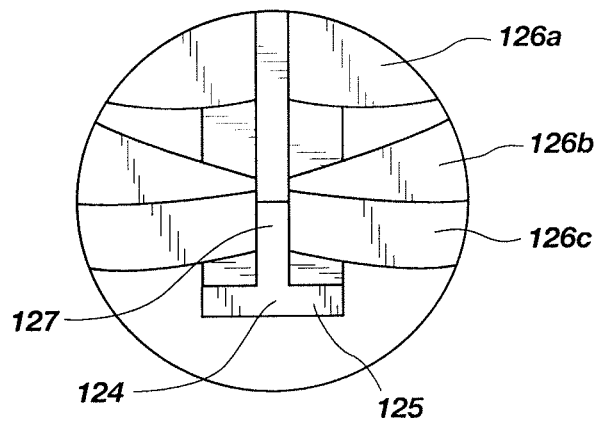

With reference to FIGS. 14A-14C, illustrated is a composite lattice support structure 110 formed in accordance with another embodiment of the present invention. FIGS. 14A and 14B illustrate a plurality of helical cross supports, including helical cross supports 126a, 126b and 126c that intersect to from various multi-layered nodes. In addition, the support structure 110 comprises a plurality of longitudinal cross supports, such as longitudinal cross support 124, each having a T-shaped cross section. As shown, the outer surface of the T-shaped (the surface facing away from the centerline) comprises a generally flat or linear surface configuration. The inner surfaces (those facing toward the centerline) also comprise a generally flat or linear configuration. However, in this particular embodiment, rounded corners having a given radius r are included where the flange portion 125 intersects with the web portion 127.

Figure 15:
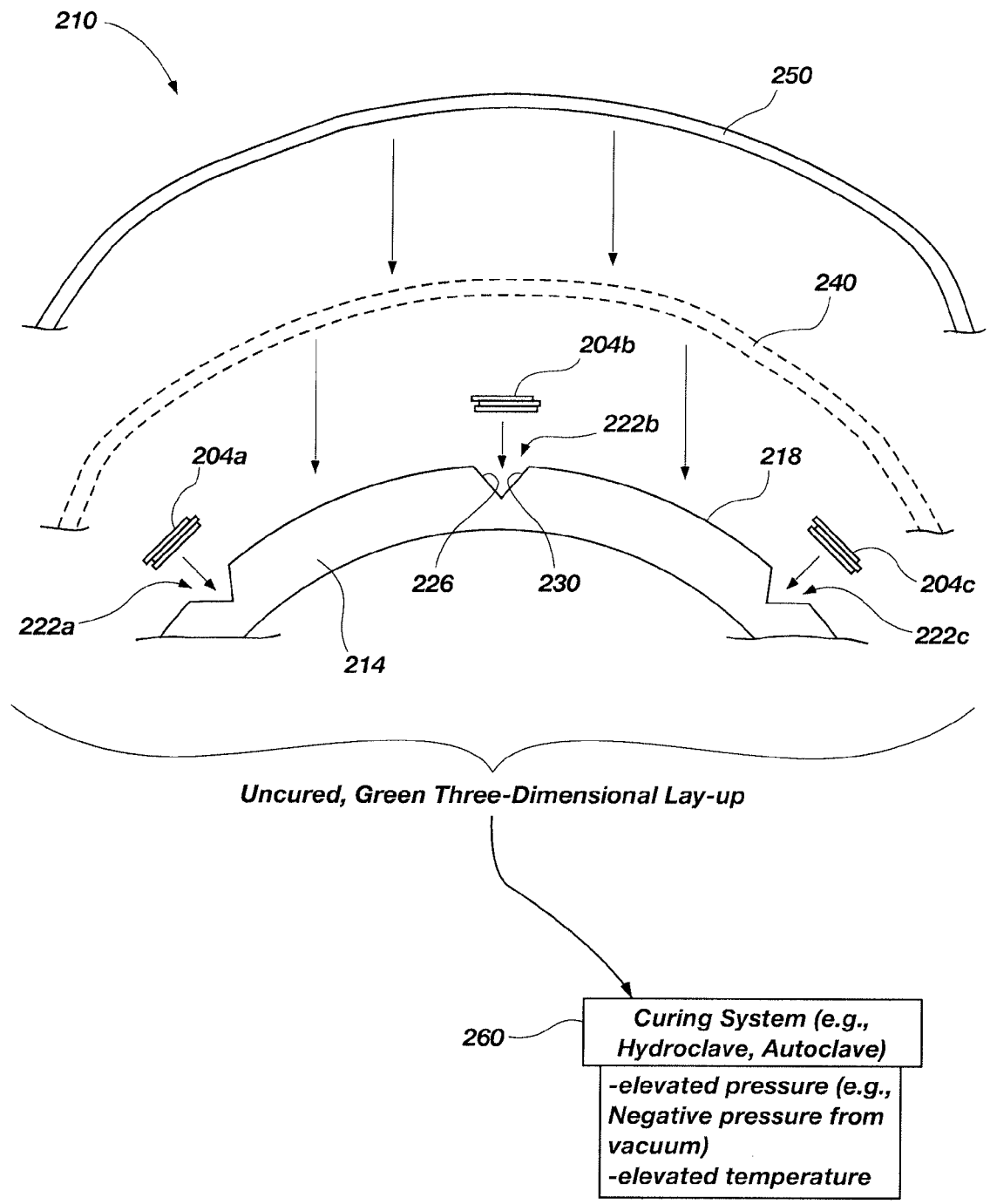
FIG. 15 depicts a partial cross-sectional view of a system used to fabricate a lattice support structure in accordance with an exemplary embodiment of the present invention.

With reference to FIG. 15, illustrated is a partial cross-sectional view of a system for fabricating complex three-dimensional lattice support structures in accordance with one exemplary embodiment of the present invention. The system 210 comprises a rigid mold in the form of a three-dimensional (e.g., in this case generally cylindrical) rigid, collapsible mandrel 214 having a working surface 218 and a plurality of channels in the form of grooves (see grooves 222a, 222b, and 222c) formed in the working surface 218. The grooves define various surface boundaries depending upon the particular cross-sectional shape desired. In the embodiment shown, the grooves comprise a triangular cross-section (when viewed in the axial or longitudinal direction of the grooves), with surfaces 226 and 230 providing the boundary of the grooves. The grooves may be formed in the mandrel 214 in any configuration or design that provides a lattice or lattice-type configuration. Although shown in cross-section, it is contemplated that the mandrel 214 will comprise an elongate, three-dimensional form or shape, with some grooves being helically oriented, longitudinally oriented, laterally oriented, different in length, different in cross-sectional area, etc. Whatever the desired or required configuration of the final lattice support structure, the mandrel 214 functions as the template or mold to provide this. Not only does the mandrel, and particularly the grooves of the mandrel, define the number, type, density, orientation etc. of the various cross supports, but it also defines the same types of parameters regarding the multi-layered nodes making up the lattice support structure. Furthermore, the mandrel permits the cross-sectional area of the cross supports and nodes making up the structural support unit to be specifically controlled, the types specific cross-sectional areas being limited only by the limitations inherent in the formation of the grooves in the mandrel.

The grooves may comprise any size, type or number and are intended to extend about the outer surface of the rigid mold (e.g., about the circumference of the cylindrical mandrel as shown) in a given direction and orientation, at least some of which are caused to intersect at various strategic locations to provide the mold with, and define the lattice configuration of, the particular composite lattice support structure to be formed. It is noted that the mandrel provides a key component in the formation of a seamless, three-dimensional lay-up of fiber materials, in the presence of resin, resulting in a seamless finished three-dimensional lattice support structure. In other words, there are no joined or fused part edges present either prior to consolidation during the formation of the uncured, green lay-up, or after consolidation of the fiber material and resin components resulting in a finished or substantially finished support structure. The part is formed and cured as a seamless structure.

Although shown and described as being cylindrical, the mandrel may comprise a number of different cross-sectional areas other than circular as viewed in the axial direction. For example, the mandrel may comprise a triangular, square, oval, airfoil, octagonal, hexagonal, rectangular, or arbitrary (comprising a linear or non-linear geometry, or a combination of these) cross-sectional geometry.

The lay-up includes fiber materials that are deposited in the grooves 222 of the mandrel in the presence of resin. FIG. 15 illustrates one embodiment where a preimpregnated (prepreg) tow or towpreg filament is situated for deposit into the various grooves of the mandrel (see towpregs 204a, 204b, and 204c to be deposited in grooves 222a, 222b, and 222c, respectively). The towpreg may be deposited in accordance with a winding technique in which the towpreg is wound onto the mandrel within the grooves at a pre-determined tension and as the mandrel rotates about a rotational axis. The towpreg may comprise various types and sizes, and may comprise various numbers of fibers, such as a 10K tow, a 12K tow, a 50K tow, a 80K tow, etc. Fiber materials other than towpreg filaments are also contemplated for use, such as prepreg tape and others as will be apparent to one skilled in the art. In addition, fiber material that is not preimpregnated, but rather post-wetted, may also be used. For instance, a dry fiber-based tow may be subjected to a resin component in situ during a winding process as it is being deposited within the channels of the rigid mold.

The system further comprises a vacuum enclosure 250 adapted for placement over the mandrel and fiber material lay-up that facilitates the drawing of a vacuum about the mandrel for assisting in the consolidation of the fiber materials and resin components. The vacuum enclosure 250 is designed to provide the pressure necessary to cure and consolidate the fiber materials in the presence of the resin, and most likely in the presence of elevated temperature. More specifically, the vacuum enclosure 250 may be adapted to apply the pressure necessary to compact the fiber material into the grooves 222 of the mandrel 214 to enhance consolidation and form the cross supports and nodes as discussed herein, as well as provide these with their specified cross-sectional geometry. The vacuum enclosure 250 is intended to seal about the mandrel 214, and particularly about the outer working surface 218 of the mandrel 214, and any additional surfaces to effectuate a proper negative pressure environment. The vacuum enclosure 250 can comprise a flexible, impermeable nylon membrane or other similar traditional vacuum bag. Alternatively, the vacuum enclosure 250 can comprise a resilient polymer (e.g., two part prepolymer or polyurethane) vacuum bag specifically formulated to provide elasticity and elongation, such as a vacuum bag product formed in accordance with the technology developed and owned by American Consulting Technology and Research Co. of Provo, Utah, and marketed under the VacuSpray trademark. The polymer vacuum bag may comprise a prepolymer that can be applied in liquid form (e.g., a spray or brush-on prepolymer) over the mandrel and fiber materials, which is then caused to polymerize to provide a sealed vacuum enclosure. In another aspect, the prepolymer composition may be applied over another suitable and applicable surface, polymerized or cured to form a pre-formed polymer vacuum bag, and then subsequently applied over the mandrel and fiber material lay-up.

The system 210 further comprises an optional release layer 240 that may be disposed between the vacuum enclosure and the mandrel and fiber material lay-up to facilitate easy removal of the vacuum enclosure from the mandrel surface and/or the formed composite lattice support structure. The release layer 240 may comprise any material known in the art, such as a fluoropolymer (PTFE (polytetrafluoroethylene) and PFA (perfluoroalkoxy polymer resin)) or FEP (Fluorinated ethylene propylene), or others. Depending upon various factors, such as the type of vacuum enclosure used, a release layer may or may not be needed.

The system 210 further comprises a curing system 260 operable to consolidate and cure the fiber materials and resin to form the cross supports and nodes (and any collars) of the lattice support structure. The curing system 260 is designed to subject the fiber material lay-up to elevated pressure and temperature for a given duration of time. The curing system 260 may comprise an autoclave or other suitable device capable of applying the necessary heat and pressure to the lay-up.

Figure 16:
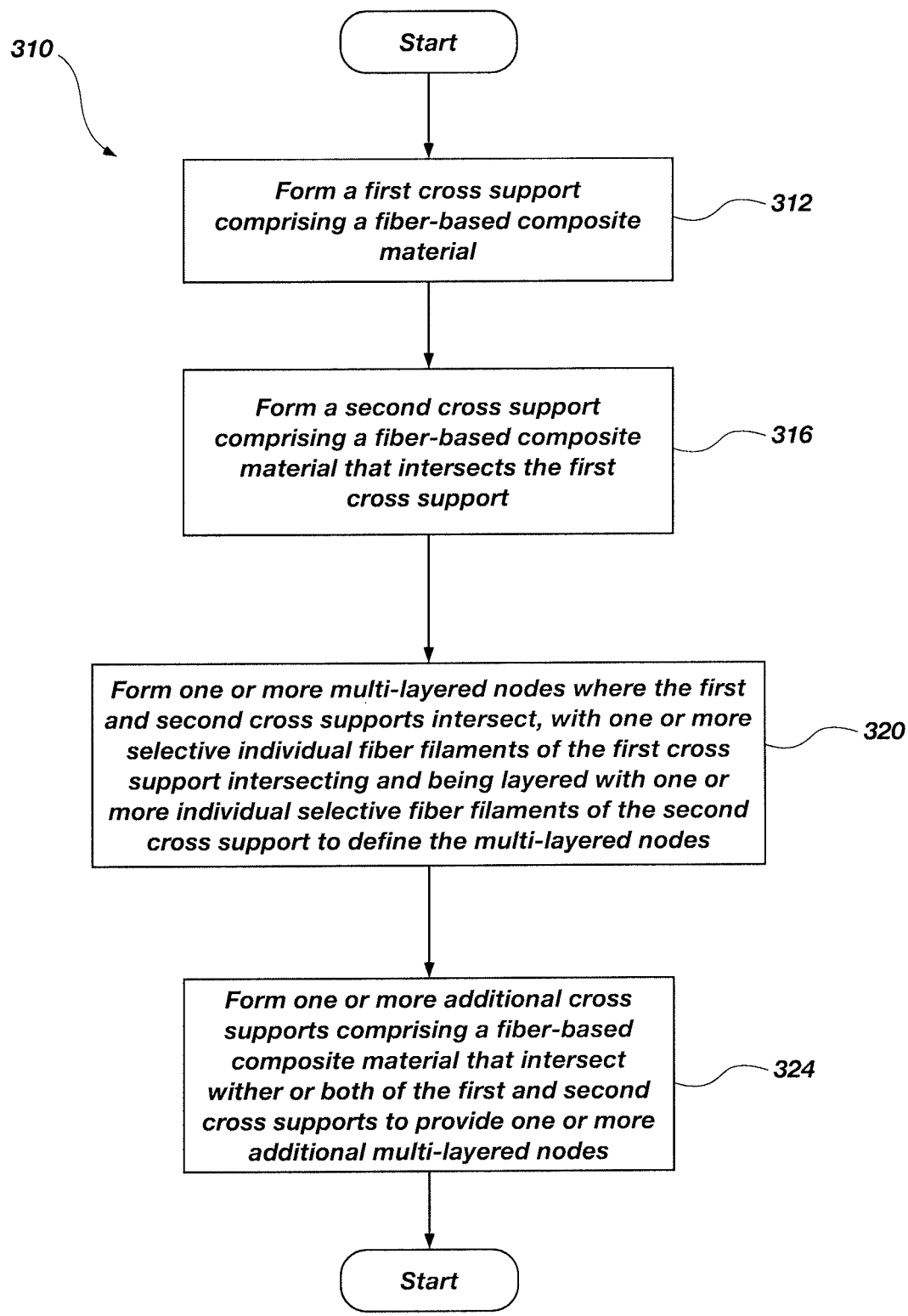
FIG. 16 depicts a flow chart of an exemplary fabrication method.

FIG. 16 illustrates a flowchart of a method for forming a composite lattice support structure in accordance with one exemplary embodiment. The method comprises generally forming first and second cross supports, each of these comprising a fiber-based composite material. The first and second cross supports are caused to intersect one another in one or more locations to define one or more multi-layered nodes. The multi-layered nodes are each comprised of one or more selective fiber filaments (individual filaments or layers of filaments) from the first cross support that intersect and layer with one or more selective fiber filaments of the second cross support. In one aspect, this may mean that the multi-layered nodes comprise at least two layers of the first cross support separated by at least one layer of the second cross support. In another aspect, this may mean that the multi-layered nodes comprise at least two layers of the second cross support separated by at least one layer of the first cross support.

The method further comprises forming one or more additional cross supports, also comprising a fiber-based composite material, that intersect one or both of the first and second cross supports to provide or define additional multi-layered nodes within the lattice support structure. Indeed, it is likely that a present invention lattice support structure will comprise a plurality of cross supports, each contributing to the overall strength and performance of the support structure. The plurality of cross supports, comprising a fiber-based composite material, may each be configured to interrelate with at least one other cross support in the same manner, namely with selective fiber filaments from each being layered with those of another cross support at the intersecting locations where a node is formed.

The several cross supports are configured to form and define a composite lattice support structure having a three-dimensional geometry about a centerline. As a result of the fabrication method, the lattice support structure is capable of being a seamless structure rather than the result of two or more segments or components formed separately and then somehow fused or otherwise brought and held together.

The first and second cross supports and any additional cross supports may be formed into a number of configurations or in accordance with a number of designs to provide different lattice support structures having different performance characteristics. The method for manufacturing described herein allows for a significant amount of versatility in terms of design considerations and options for complex three-dimensional lattice support structures, which is evidenced by the many different configurations described or contemplated herein, some of which are illustrated in the accompanying drawings. For example, the method may comprise forming one or more cross supports to comprise a curved segment between nodes to provide non-linear path loading along the cross support. Depending upon the cross-sectional area of the lattice support structure, curved segments may be present in a plurality of forward or reverse helically oriented cross supports. These helicals may be evenly or unevenly spaced apart from one another (asymmetric spacing), some may have a different pitch than others, some may have a variable pitch or helix angle, and/or they may be present in differing densities about the structure. The support structure may also be formed with a different number or uneven ratio of forward and reverse helicals, thus giving the support structure increased strength in a given direction.

In another example, the support structure may comprise any number of lateral, linear or circumferentially oriented cross supports in combination with the helical or reverse helical cross supports, with these also being present in various size, in various locations, in various concentrations, in various densities, etc. Although the majority of time this will most likely be the case, it is also noted that the cross supports and the nodes they define do not necessarily need to comprise any particular type of pattern or symmetry. Indeed, lattice configurations where nodes are completely randomly located or that are present in higher or reduced concentrations or densities about the support structure are also entirely possible and contemplated.

In many cases, it will be necessary or desirable to form the lattice support structure to comprise areas of selective reinforcement or areas of higher strength. In such cases, forming the lattice support structure to comprise cross supports that are grouped or concentrated in these areas, or that are of differing type and/or orientation (or a combination of these) will enhance the inherent performance characteristics of the lattice support structure in these areas, thus being capable of better meeting often stringent engineering specifications.

Some of the advantageous properties of the present invention composite lattice support structure is that it comprises a constant load path throughout. A related advantage is that, in the event of breakage or failure of one or more cross supports or nodes, the lattice support structure is configured such that the load path is transferred to one or more unbroken cross supports to compensate for the reduction in performance or failure.

The method further comprises forming the cross supports such that the resulting lattice support structure comprises a non-uniform cross section as taken along the longitudinal axis or centerline. Lattice support structures with a uniform cross section are obviously contemplated, but some applications may require those having non-uniform cross-sections.

The method further comprises controlling the cross-sectional geometry of some or all of the individual cross supports within a lattice support structure, which cross-sectional geometry of the cross supports is dictated by the corresponding cross-sectional geometry of the channels of the rigid mold in which the fiber material is initially deposited. Controlling the cross-sectional geometry of the cross supports means controlling the elements and parameters used to fabricate these. For example, to achieve a t-shaped or flanged geometry, the channels of the rigid mold will be configured with a suitable t-shaped or flanged configuration. These will have a suitable and accurate amount of fiber material deposited in them in order to achieve the desired geometry after consolidation.

The method further comprises forming a circumferential collar around or about one or both ends of the lattice support structure, wherein the collar comprises fiber material that is integrally formed and consolidated with the fiber material of one or more cross supports.

The present invention provides a unique method for fabricating or manufacturing the composite three-dimensional lattice support structures discussed above. In one exemplary embodiment, the method comprises wrapping pre-impregnated fiber filaments or tow (e.g., 12K tow) around a rigid, break-away mandrel having a series of grooves or channels formed into the surface of the mandrel generally conforming to the desired configurations or patterns of the various cross members, end collars, multi-layered nodes, etc. to be formed, and providing a solid geometric base for the formation of the support structure during production. Though a secondary wrap, e.g., KEVLAR, may be applied once the structure has been cured or combined with the primary fibers before cure, enhanced consolidation of members can be achieved through covering the uncured structure with a bagging system, creating negative pressure over at least the multi-layered nodes, and running it through an autoclave or similar curing cycle where the fiber prepreg tow is compacted into the grooves, consolidated, and formed generally to the cross-sectional geometry of that of the grooves. This adds strength through allowing segments of components to be formed from a continuous filament, while also allowing the various strands in a single member to be consolidated during curing. Other embodiments and additional detail regarding the fabrication of the present invention lattice support structures are provided below.

Figure 17:
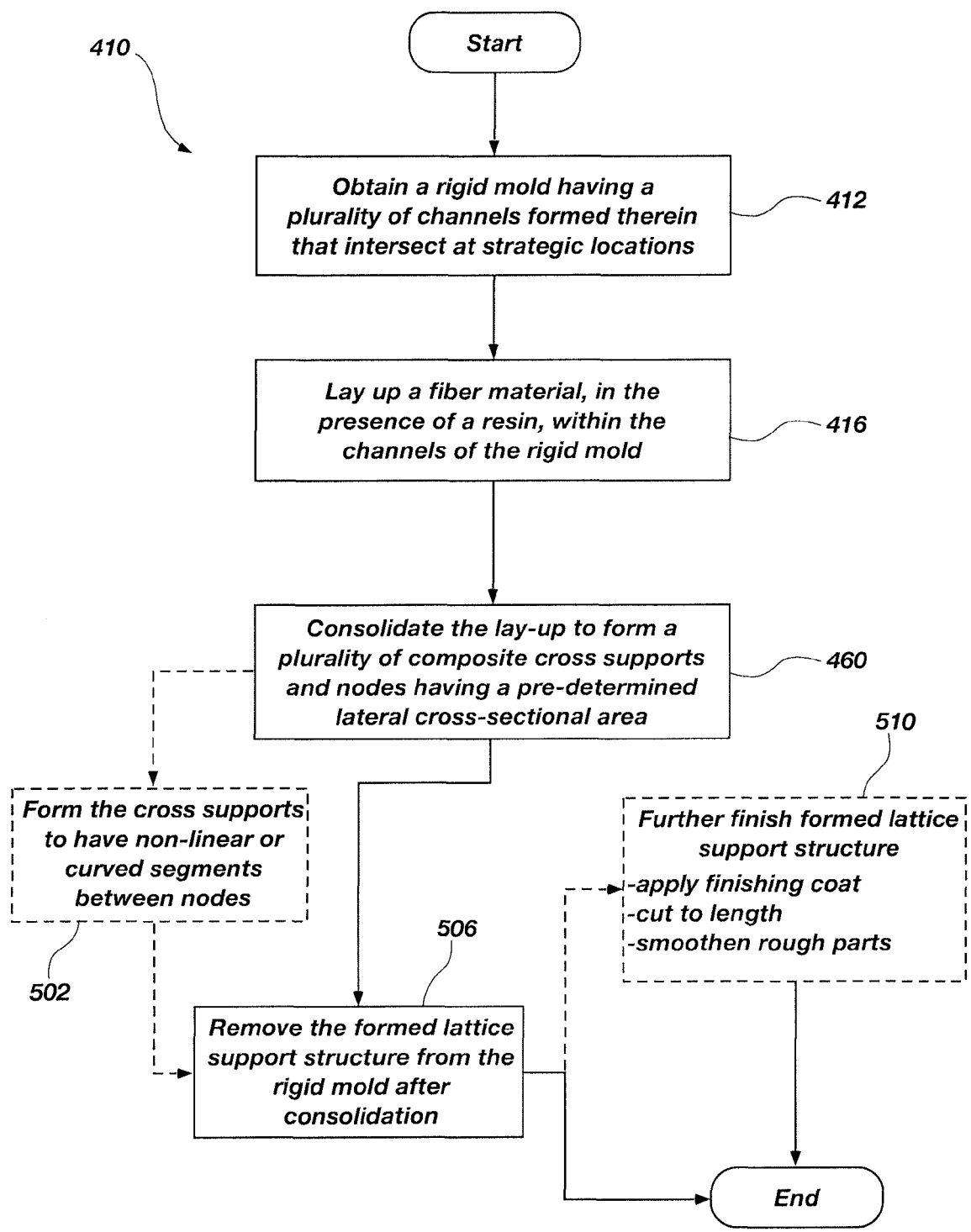
FIG. 17 depicts a flow chart of another exemplary fabrication method.

With reference to FIG. 17, one exemplary method comprises obtaining a rigid mold having a plurality of channels formed therein that intersect at strategic locations (412); laying up a fiber material, in the presence of resin, within the channels of the rigid mold (416); consolidating the lay-up to form a plurality of composite cross supports and nodes having a pre-determined lateral cross-sectional geometry, and to form a three-dimensional lattice support structure (460); removing the formed lattice support structure from the rigid mold (506); and optionally, further finishing the formed lattice support structure (510). The method may further comprise forming the cross supports to comprise a non-linear or curved configuration between nodes (502).

Figure 18:
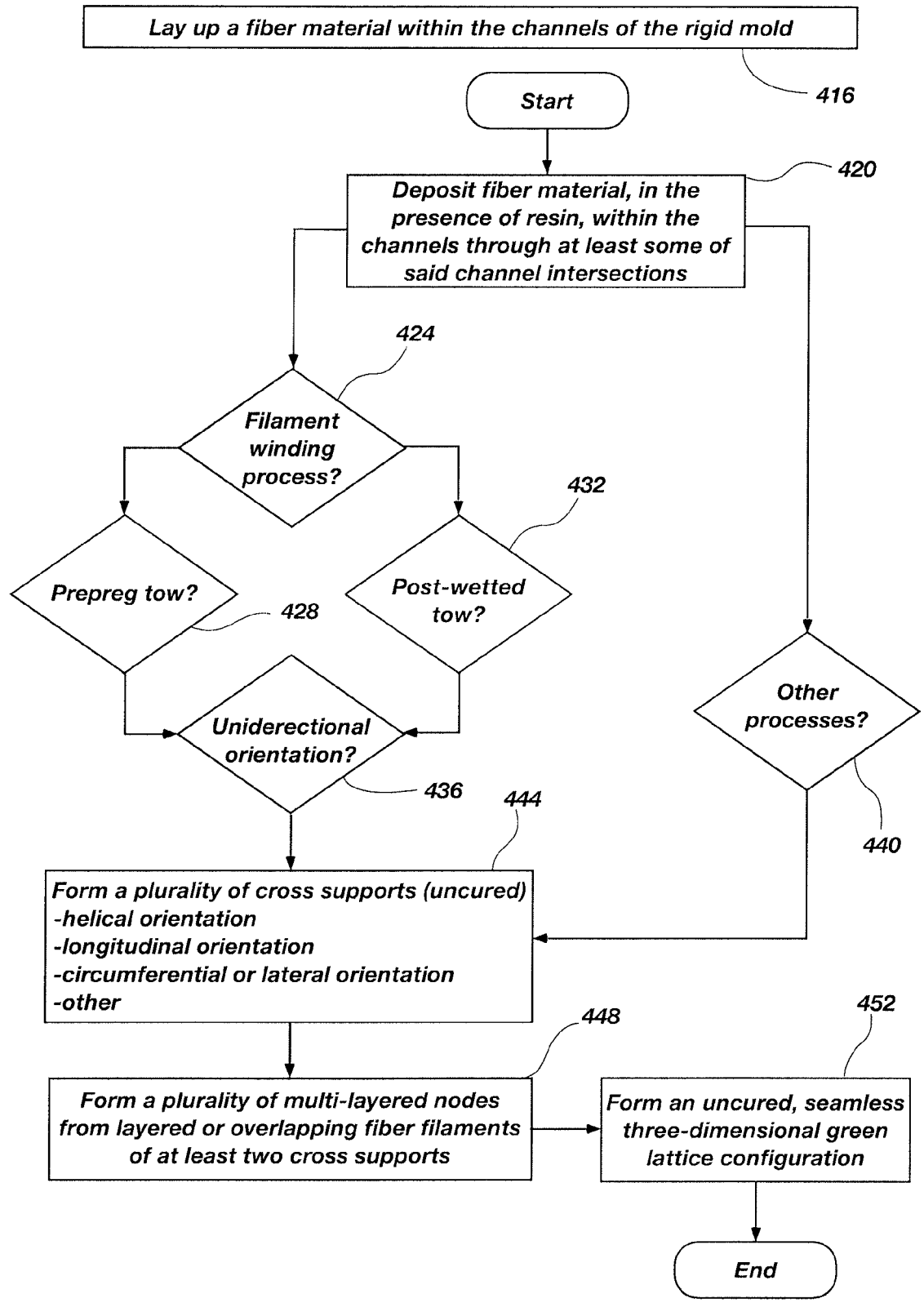
FIG. 18 depicts a flow chart of an exemplary laying up process.

Turning to FIG. 18, laying up the fiber material within the channels of a rigid mold (416) contributes to the versatility and ease of manufacture of the lattice support structure. This starts with depositing a fiber material, in the presence of resin, within the channels with the fiber materials extending through the intersections formed in the rigid mold (420). Although other methods may be employed (440), this will typically involve a filament winding process (424) using a prepreg tow or towpreg (428) or a post-wetted tow (432) dispensed from a spool at a given tension and speed. Filaments that are deposited within the channels under a relatively high tension generally results in a final product with higher rigidity and strength, while filaments deposited using a lower tension generally results in more flexibility. In addition, in one aspect, the fiber material may be laid up to extend in a unidirectional orientation within the channels and through the nodes (436) so that any directional changes at the nodes is eliminated. Unidirectional orientation of the fiber material or fiber filaments contributes to more efficient layering of the fibers, and to the eventual overall strength of the unit once formed. In another aspect, directional changes of the fiber material at the nodes may be made if desired. However, it is noted that even with directional changes at the nodes, the unidirectional orientation of the fiber materials or filaments within any given channel may be maintained.

Depositing fiber material within the channels in the presence of a resin leads to the formation of a plurality of green, uncured members that will ultimately become the various types of rigid cross supports (444) and resulting nodes (448) that make up the lattice support structure. Although these are in a green, uncured or unconsolidated state upon the completion of the filament winding phase, the result is a green, uncured, three-dimensional lattice preform configuration already having a seamless formation (452) prior to undergoing any curing or consolidation processes.

Figure 19:
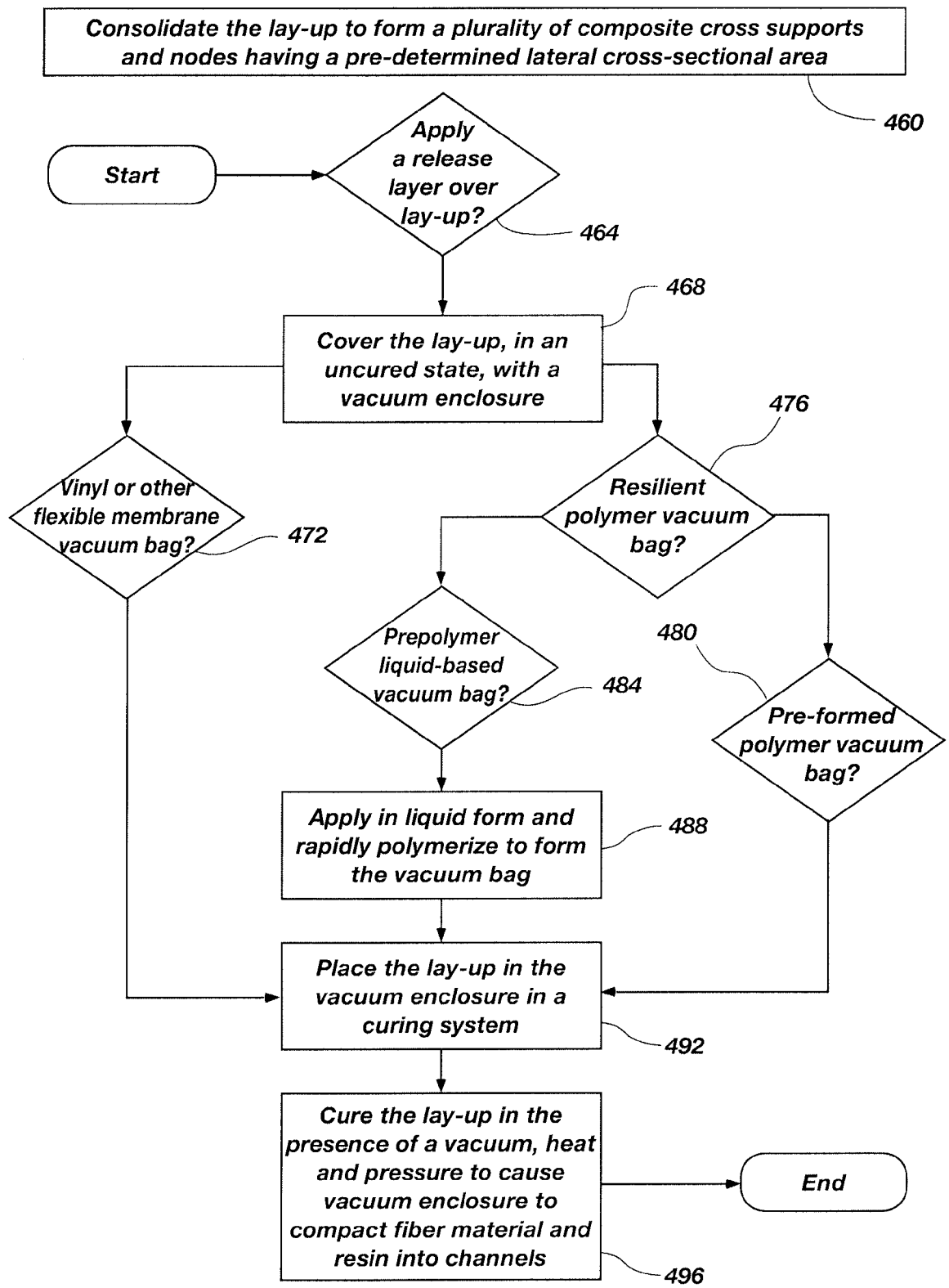
FIG. 19 depicts a flow chart of an exemplary consolidation process.

With reference to FIG. 19, in one exemplary embodiment, consolidating the uncured fiber material lay-up just described to form the cross supports and nodes (460) comprises covering the rigid mold and fiber material lay-up with a vacuum enclosure (468). Optionally, a release layer may be situated or applied (464) between the rigid mold and fiber material lay-up and the vacuum enclosure in order to facilitate easier release of the vacuum enclosure from the formed lattice structure. Depending upon the type of vacuum enclosure used, a separate release layer may or may not be necessary.

In the event a nylon or other flexible membrane based vacuum bag is used (472), the method will involve placing this over the rigid mold and fiber material lay-up and subsequently forming one or more vacuum ports therein that can be coupled to a vacuum source. The vacuum bag will also most likely need to be sealed to the surface of the rigid mold about the fiber material lay-up using tacky tape or other sealing means. Alternatively, a resilient polymer vacuum bag may be used (476). With this type of vacuum bag, applying it may be carried out in a number of different ways. For example, in a first aspect, a prepolymer composition (484) may be applied in liquid form (488) using a spray gun, brushes, etc. In one exemplary embodiment, the prepolymer liquid rapidly polymerizes under ambient conditions (no elevated heat or pressure) to form the vacuum bag. In another aspect, the polymer vacuum bag may be preformed and applied in a similar manner as a more traditional type of vacuum bag.

Consolidating further comprises placing the lay-up with the vacuum enclosure in a curing system (492) and curing the lay-up in the presence of a vacuum, heat and pressure to cause the vacuum enclosure to compact the fiber material into the channels (496). Drawing a vacuum may comprise fluidly coupling one or more vacuum ports to the lay-up and also to a vacuum source. As a vacuum is drawn, the resulting negative pressure acts to cause the vacuum enclosure to apply a significant increased pressure to the fiber materials situated within the channels. As this pressure is applied, the fiber materials begin to compact into or within the channels. Simultaneously, the channel surfaces apply a counteracting force on the fiber materials, constraining their movement or displacement. As heat and pressure is applied for a given duration, the fiber materials consolidate with the resin, and are caused to substantially assume the geometry of the channels, bounded also by the vacuum enclosure. Consolidation may continue as long as needed to eliminate or minimize any remaining voids.

Being able to manipulate the cross-sectional geometry of the cross sectional shape of the individual cross supports is a significant advantage of the present invention lattice support structure manufacturing method. This provides the ability to control or manipulate the moment of inertia of the cross support members. For example, the difference in inertial moments of a flat unit of about 0.005" thickness and a T-shaped unit of the same amount of material can reach up to and beyond a factor of 200. With the use of a r, pressure application, and resin/temperature curing, measurement has shown that geometric tolerances can be kept at less than 0.5%.

It has been recognized that the closer the fibers are held together, the more they act in unison as a single piece rather than a group of fibers. In composites, resin can facilitate holding the fibers in close proximity to each other both in the segments of the cross supports themselves, and at the multi-layered nodes when more than one directional path is being taken by groups of unidirectional layered fibers. In filament winding systems of the present disclosure, composite tow or roving or tape (or other shaped filaments) can be wound and shaped into the channels of a rigid mandrel, and then the composite fibers forced together using pressure. Under this pressure, heat can be used to fuse the multi-layered nodes, generating a tightly consolidated multi-layered node. Thus, the multi-layered node is constrained within the channels or otherwise held in place tightly using pressure from both the vacuum enclosure and the surfaces of the channels. Under such pressure from all sides, the multi-layered node (including the filament or tow material and the resin) can be heat fused or cured, making the multi-layered node more highly compacted and consolidated than other systems in the prior art. As a result, high levels of consolidation (90-100% or even 98-100%) can be achieved. In other words, porosity of the consolidated material providing voids and weak spots in the structure are significantly reduced or even virtually eliminated. In short, consolidation control using a rigid mandrel, pressure over the wound filament or fibers, and resin/heat curing provides high levels of consolidation that strengthen the lattice structure as a whole.

Referring again to FIG. 17, the method may further comprise removing the vacuum enclosure and separating the composite lattice support structure from the rigid mold (506). This may include collapsing the rigid mold to relieve the internal pressure acting on the finished lattice support structure. In terms of further finishing the formed lattice support structure (510), this may include trimming edges or ends, deburring and/or sanding where necessary etc. This may also include coating the surfaces of the support structure with a finishing coat. For example, in one aspect, this may comprise spraying the surfaces with the same VacuSpray material described above, or another similar type of protective coating.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function limitation are expressly recited in the description herein. Accordingly, the scope of the invention should be determined solely by the appended claims and their legal equivalents, rather than by the descriptions and examples given above.

What is claimed and desired to be secured by Letters Patent is:

1. A method for forming a composite lattice support structure, said method comprising:
    forming a first cross support comprising a fiber-based composite material, said first cross support having one or more selective individual fiber filaments layered in an offset configuration;
    forming a second cross support comprising a fiber-based composite material that intersects said first cross support, said second cross support having one or more selective individual fiber filaments layered in an offset configuration; and
    forming one or more multi-layered nodes where said first and second cross supports intersect, with said one or more selective individual fiber filaments of said first cross support intersecting and being layered with said one or more individual selective fiber filaments of said second cross support to define said multi-layered nodes,
    wherein said first and second cross supports define a lattice support structure having a seamless three-dimensional geometry about a centerline.

2. The method of claim 1, wherein said forming said first and second cross supports comprises laying up fiber filament to provide each of said first and second cross supports with multiple layers, respectively, wherein said multi-layered nodes comprise at least two layers of said first cross support separated by at least one layer of said second cross support.

3. The method of claim 1, wherein said forming said first and second cross supports comprises laying up fiber filament to provide each of said first and second cross supports with multiple layers, respectively, wherein said multi-layered nodes comprise at least two layers of said second cross support separated by at least one layer of said first cross support.

4. The method of claim 1, further comprising forming a third cross support comprising a fiber-based composite material that intersects at least one of said first and second cross supports.

5. The method of claim 4, further comprising forming one or more multi-layered nodes where said first and second and third cross supports intersect, with one or more selective individual fiber filaments from each of said first and second and third cross supports intersecting and being layered to define said multi-layered nodes.

6. The method of claim 1, further comprising forming at least one of the first and second cross supports on a curve from node to node to provide non-linear path loading along said first and second cross supports.

7. The method of claim 4, wherein said forming a third cross support comprises laying up fiber filament to provide said third cross support with multiple layers, wherein said multi-layered nodes comprise at least one layer of said third cross support layered with at least one layer of at least one of said first and second cross supports.

8. The method of claim 4, further comprising forming said third cross support on a curve from node to node to provide non-linear path loading.

9. The method of claim 1, wherein said forming a first cross support comprises forming a first helical cross support.

10. The method of claim 9, wherein said forming a second cross support comprises forming a second helical cross support.

11. The method of claim 10, wherein said second helical cross support is oriented in a reverse direction from that of said first helical cross support.

12. The method of claim 4, further comprising forming said first, second and third cross supports in an orientation selected from the group consisting of a helical orientation, a longitudinal orientation, and a lateral orientation.

13. The method of claim 4, further comprising forming at least one of said first, second and third cross supports in a longitudinal orientation, and forming at least two of said first, second and third cross supports in a helical orientation.

14. The method of claim 4, further comprising forming each of said first, second and third cross supports in a helical orientation.

15. The method of claim 4, further comprising forming at least one of said first, second and third cross supports in a circumferential or lateral orientation.

16. The method of claim 1, wherein said lattice support structure comprises a generally cylindrical shape, and a plurality of helical cross supports.

17. The method of claim 16, wherein said lattice support structure of generally cylindrical shape further comprises a plurality of cross supports selected from longitudinal cross supports and lateral cross supports.

18. The method of claim 16, wherein at least some of either of said longitudinal cross supports and lateral cross supports are asymmetrically spaced apart from one another.

19. The method of claim 16, wherein at least some of either of said longitudinal cross supports and lateral cross supports are grouped together within a given radial area to provide selective reinforcement of certain segments of said lattice support structure.

20. The method of claim 16, wherein a first radial area comprises a greater concentration of said longitudinal cross supports than a different second radial area of equal size.

21. The method of claim 16, wherein at least some of said plurality of helical cross supports comprise a different pitch.

22. The method of claim 10, wherein said second helical support comprises a different pitch than said first helical support.

23. The method of claim 1, further comprising forming a plurality of cross supports comprising a fiber-based composite material that intersect to form a plurality of multi-layered nodes, in accordance with a pre-determined cross support density.

24. The method of claim 1, wherein said first cross support is part of a plurality of helical cross supports, and wherein said second cross support is part of a plurality of reverse helical cross supports, said lattice support structure comprising a different number of said helical and reverse helical cross supports to provide said lattice support structure for increased strength in a given direction.

25. The method of claim 1, wherein said first cross support is part of a plurality of helical cross supports, at least some of said plurality of helical cross supports having a different orientation.

26. The method of claim 1, wherein said first cross support is part of a plurality of helical cross supports, at least some of said plurality of helical cross supports being unevenly spaced with respect to one another.

27. The method of claim 1, wherein said first cross support comprises a helical cross support having a variable pitch.

28. The method of claim 1, further comprising configuring said lattice support structure to comprise a circumferentially closed geometry.

29. The method of claim 1, wherein said lattice support structure comprises a constant load path throughout.

30. The method of claim 1, wherein said lattice support structure comprises a variable shape in the axial direction as measured radially outward from a centerline.

31. The method of claim 1, wherein said lattice support structure comprises a cross-sectional geometry selected from the group consisting of linear, nonlinear, and a combination of these.

32. The method of claim 4, further comprising forming said cross supports with a specific, pre-determined cross-sectional geometry, said cross-sectional geometry of said cross supports being specifically controlled through a corresponding cross-sectional geometry of said channels of said rigid mold.

33. The method of claim 32, wherein a surface of said cross support oriented away from a centerline of said lattice support structure conforms to a general geometry of said lattice support structure through pressurized consolidation of said fiber filaments, and wherein a remaining surface of said cross support conforms to a shape of said channel of said rigid mold to provide said cross-sectional geometry.

34. The method of claim 32, wherein at least one of said cross supports comprises a different cross-sectional geometry than that of another of said cross supports.

35. The method of claim 32, wherein said cross-sectional geometry of said cross supports is selected from the group consisting of square, triangular, t-shaped, I-beam shaped, rectangular, circular, oval.

36. The method of claim 32, wherein said cross-sectional geometry of said cross supports comprises a cross-sectional geometry having surfaces selected from the group consisting of linear, nonlinear, and a combination of these.

37. The method of claim 1, wherein said forming said first and second cross supports, and said forming said multi-layered nodes comprises consolidating said fiber filaments in the presence of resin, heat and pressure.

38. The method of claim 1, further comprising forming a circumferential collar about an end of said lattice support structure, said circumferential collar comprising fiber filaments integrally formed and consolidated with said fiber filaments of said first and second cross supports.

39. The method of claim 1, further comprising forming a plurality of cross supports to concentrate strength in a given location and direction of said lattice support structure.

40. The method of claim 1, further comprising configuring said lattice support structure such that, in the event of localized breakage in one of said cross supports resulting in reduced performance or failure, a load path is changed and transferred to one or more unbroken cross support to compensate for said reduced performance or failure.

41. A method for forming a composite lattice support structure having a plurality of cross supports intersecting one another to form a plurality of multi-layered nodes, said method comprising:
- obtaining a rigid mold having a plurality of rigid channels, at least some of said plurality of rigid channels intersecting at strategic locations;
- laying up a fiber material in an off-set configuration, in the presence of a resin, within said channels; and
- consolidating said lay-up to form a plurality of composite cross supports having a pre-determined lateral cross-sectional area controlled by a cross-sectional area of said channels, and that intersect to form a plurality of nodes, said channels containing said lay-up during said consolidating, and facilitating formation of said cross supports and multi-layered nodes.

42. The method of claim 41, wherein at least some of said cross supports are curved from node to node to provide non-linear path loading along said cross supports.

43. The method of claim 41, wherein said rigid mold comprises a rigid mandrel having a plurality of grooves formed in a surface, said grooves defining a number, an orientation, a location and a density of said cross supports and said nodes as part of said formed composite lattice support structure.

44. The method of claim 41, wherein said rigid mold comprises a collapsible mandrel, and wherein said method further comprises collapsing said mandrel to facilitate easy removal of said formed lattice support structure from said rigid mold after consolidation.

45. The method of claim 41, wherein said channels of said rigid mold comprise a specific, pre-determined cross-sectional area that provide said cross supports with a corresponding cross-sectional area.

46. The method of claim 41, wherein said laying up a fiber material comprises depositing fiber filaments within said channels in a unidirectional orientation through at least some of said channel intersections so said fiber materials maintain a unidirectional path through said formed nodes.

47. The method of claim 41, wherein said laying up a fiber material, in the presence of a resin, prior to consolidation and in an uncured state, provides a seamless three-dimensional green lattice support structure prior to said consolidating.

48. The method of claim 41, wherein said laying up a fiber material, in the presence of a resin, comprises winding a fiber-based tow onto said rigid mold in accordance with a pre-determined winding process, said channels providing a secure pathway for said tow.

49. The method of claim 48, wherein said fiber-based tow comprises a preimpregnated tow.

50. The method of claim 41, wherein said consolidating comprises:
drawing a vacuum about said lay-up to increase a pressure acting on said lay-up, said pressure causing said fiber material to assume a geometry of said channels; and
subjecting said lay-up to an elevated temperature for a given time.

51. The method of claim 41, wherein said consolidating comprises:
covering said lay-up, in an uncured state, with a vacuum enclosure;
placing said lay-up as covered with said vacuum enclosure in a curing system; and
curing said lay-up within said curing system in the presence of a vacuum, heat and pressure,
said vacuum enclosure compacting said fiber material, in the presence of said resin, within said channels of said rigid mold, and causing said fiber material to assume a geometry of said channels.

52. The method of claim 41, further comprising forming a plurality of multi-layered nodes from layered or overlapping fiber filaments of at least two cross supports selected from the group consisting of non-straight cross supports, helical cross supports, longitudinal cross supports, axial cross supports and lateral or circumferential cross supports.

53. A method for preparing a green composite three-dimensional lattice preform configuration for use in forming a seamless three-dimensional geometric lattice support structure, said method comprising:
obtaining a rigid mold having one or more channels associated therewith;
obtaining a fiber material;
depositing said fiber material, in the presence of a resin, onto said rigid mold within said channels;
causing at least some of said fiber materials to be oriented in a three-dimensional orientation about a centerline; and
causing one or more of said fiber materials to intersect and layer to form a lattice structure, and to form a plurality of multi-layered nodes
wherein said at least some of the fiber materials layer in an offset configuration.

54. The method of claim 53, further comprising causing additional fiber materials to extend in a lateral, circumferential or axial orientation with respect to said centerline, which additional fiber materials may be caused to intersect and be layered with any other present fiber materials.

55. A system for forming complex three-dimensional composite lattice support structures, said system comprising:
a rigid mold having a plurality of rigid channels, at least some of said plurality of rigid channels intersecting at strategic locations;
a lay-up of fiber material, in the presence of a resin, within said channels, said fiber material comprising fiber filaments that are layered in an off-set configuration with one another and that intersect at said strategic locations; and
a curing system for consolidating said lay-up to form a plurality of cross supports and multi-layered nodes.

56. The method of claim 1, further comprising curing the composite lattice support structure at a temperature of 250-350° F. under nitrogen gas at a pressure of 90-150 psi for a period of 10-240 minutes.

57. The method of claim 1, wherein the multi-layered nodes are flattened in shape.

58. The method of claim 1, further comprising compacting the fiber-based composite material of the first and second cross supports into a rigid channel of a mandrel.

59. The method of claim 4, wherein the composite lattice support structure includes at least two different types of multi-layered nodes including a first multi-layered node formed where three cross supports intersect, said three cross supports are a first longitudinal cross support, a first clockwise helical cross support, and a first counterclockwise helical cross support, and a second multi-layered node formed where two helical cross supports intersect, said two helical cross supports are a second clockwise helical cross support and a second counterclockwise helical cross support; wherein the first multi-layered node and the second multi-layered node are present in a 1:1 ratio.

60. The method of claim 41, further comprising curing the composite lattice support structure at a temperature of 250-350° F. under nitrogen gas at a pressure of 90-150 psi for a period of 10-240 minutes.

61. The method of claim 41, wherein the multi-layered nodes are flattened in shape.

62. The method of claim 41, wherein the composite lattice support structure includes at least two different types of multi-layered nodes including a first multi-layered node formed where three cross supports intersect, said three cross supports are a first longitudinal cross support, a first clockwise helical cross support, and a first counterclockwise helical cross support, and a second multi-layered node formed where two helical cross supports intersect, said two helical cross supports are a second clockwise helical cross support and a second counterclockwise helical cross support; wherein the first multi-layered node and the second multi-layered node are present in a 1:1 ratio.

63. The method of claim 53, wherein the green composite three-dimensional lattice preform configuration includes at least two different types of multi-layered nodes including a first multi-layered node formed where three cross supports intersect, said three cross supports are a first longitudinal cross support, a first clockwise helical cross support, and a first counterclockwise helical cross support, and a second multi-layered node formed where two helical cross supports intersect, said two helical cross supports are a second clockwise helical cross support and a second counterclockwise helical cross support; wherein the first multi-layered node and the second multi-layered node are present in a 1:1 ratio.

64. The system of claim 55, wherein the curing system cures the composite lattice support structure at a temperature of 250-350° F. under nitrogen gas at a pressure of 90-150 psi for a period of 10-240 minutes.

65. The system of claim 55, wherein the multi-layered nodes are flattened in shape.

66. The system of claim 55, wherein the complex three-dimensional composite lattice support structures include at least two different types of multi-layered nodes including a first multi-layered node formed where three cross supports intersect, said three cross supports are a first longitudinal cross support, a first clockwise helical cross support, and a first counterclockwise helical cross support, and a second multi-layered node formed where two helical cross supports intersect, said two helical cross supports are a second clockwise helical cross support and a second counterclockwise helical cross support; wherein the first multi-layered node and the second multi-layered node are present in a 1:1 ratio.

\* \* \* \* \*